United States Patent [19]

Froschermeier

[11] Patent Number: 5,525,992
[45] Date of Patent: Jun. 11, 1996

[54] METHOD AND SYSTEM FOR CONSERVING POWER IN A RECOGNITION SYSTEM

[75] Inventor: Guenther Froschermeier, Abensberg, Germany

[73] Assignee: Texas Instruments Deutschland GmbH

[21] Appl. No.: 339,091

[22] Filed: Nov. 14, 1994

[51] Int. Cl.[6] .................................................. G01S 13/75
[52] U.S. Cl. ...................... 342/42.000; 342/44; 342/50; 342/51; 340/825.34; 340/825.54
[58] Field of Search .................................. 342/44, 42, 50, 342/51; 340/825.34, 825.54, 825.32, 901

[56] References Cited

U.S. PATENT DOCUMENTS

| 4,338,587 | 7/1982 | Chiappetti | 340/32 |
|---|---|---|---|
| 4,691,202 | 9/1987 | Denne et al. | 340/825.54 |
| 4,888,591 | 12/1989 | Landt et al. | 342/44 |
| 4,912,471 | 3/1990 | Tyburski et al. | 342/42 |
| 5,053,774 | 10/1991 | Schuermann et al. | 342/44 |
| 5,086,389 | 2/1992 | Hassett et al. | 364/401 |
| 5,128,669 | 7/1992 | Dadds et al. | 340/901 |
| 5,144,314 | 9/1992 | Malmberg et al. | 342/44 |
| 5,144,553 | 9/1992 | Hassett et al. | 364/401 |
| 5,164,732 | 11/1992 | Brocklesby et al. | 342/44 |
| 5,196,846 | 3/1993 | Brockelsby et al. | 340/993 |
| 5,253,162 | 10/1993 | Hassett et al. | 364/405 |
| 5,450,088 | 9/1995 | Meier et al. | 342/51 |
| 5,471,212 | 11/1995 | Sharpe et al. | 342/51 |

FOREIGN PATENT DOCUMENTS 0401192  5/1990  European Pat. Off. ........ G07B 15/00

*Primary Examiner*—John B. Sotomayor
*Attorney, Agent, or Firm*—Brian C. McCormack; James C. Kesterson; Richard L. Donaldson

[57] ABSTRACT

A system and method for avoiding the discharge of a battery or otherwise excessive power consumption by a transponder (14) in the presence of a spurious noise source. In a described embodiment, the transponder (14) renders itself immune to activation by presence of RF energy for some period if the transponder does not receive a proper wake-up message within an activation period.

23 Claims, 9 Drawing Sheets

METHOD AND SYSTEM FOR CONSERVING POWER IN A RECOGNITION SYSTEM

CROSS-REFERENCE TO RELATED PATENTS

The following commonly assigned patent applications are hereby incorporated herein by reference:

| Pat No./Serial No. | Filing Date | TI Case No. |
| --- | --- | --- |
| 5,053,774 | 2/13/91 | TI-12797A |
| 07/981,635 | 11/25/92 | TI-16688 |
| 08/021,123 | 2/23/93 | TI-17529 |
| 08/233,839 | 4/26/94 | TI-18205 |

FIELD OF THE INVENTION

This invention generally relates to recognition systems of the type which include an interrogator and a transponder, and more particularly to such a system in which the interrogator transmits an interrogation signal to the transponder in response to which the interrogator transmits back to the interrogator a response signal. The invention further generally relates to improved methods of communicating between the interrogator and the transponder. In specific embodiments, the invention relates to an Automatic Vehicle Identification (AVI) type of recognition system.

BACKGROUND OF THE INVENTION

The invention will be described in the context of an Automatic Vehicle Identification (AVI) system capable of exchanging data codes between an interrogator and a transponder. The AVI field is but one environment in which the inventive concepts described herein can be applied. Systems using batteryless transponders, as well as transponders with batteries, may be used for identifying or locating objects bearing the transponders such as cattle, luggage or other items. Further, a transponder might provide status information regarding the object on which it is located, such as a transponder borne on a car door indicating whether that car door is open. Transponders utilized in the above recognition systems or others may be powered from batteries or from wireless radio frequency (RF) signals.

With respect to AVI systems, generally, the interrogator is provided in a toll booth of a toll road, parking garage or other limited access facility. The interrogator (reader) identifies passing automobiles by sending wireless interrogation signals to a transponder (tag), which would normally be a small, self-contained unit placed, for example, on the dashboard or windshield of the car. In this way the car (or other vehicle or object) can be identified in a speedy and efficient manner. Depending on the use of the system, an account associated with the driver, owner, or other designated person can be debited with an access charge. Compatibility standards for one such AVI system are set out in Title 21, Division 2, Chapter 16, Articles 1–4 of the California Code of Regulations, herein known as the Caltrans specification or Caltrans spec. The AVI equipment for toll collection typically consists of two functional elements: vehicle-mounted transponders and fixed-position interrogators.

Because the transponders typically either derive their operating power from a small battery, or from a received RF signal, the transponders are not normally active. The interrogator will transmit an RF trigger pulse to activate (turn-on) the transponders in approaching cars or other objects. The interrogator may transmit a number of RF trigger pulses at regular intervals to wake up any approaching transponders. Alternatively, the interrogator might send an RF trigger pulse in response to an external stimulus to the interrogator indicating that a transponder is approaching (e.g., light, heat, or magnetic sensors). After a time delay, the interrogator or reader then transmits an encoded signal, referred to as the Polling message or interrogation which, upon detection and decoding by the transponder or tag, provides initial information to the transponder as to which data blocks the transponder should transmit.

For transponders having low power ("sleep") modes as in commonly assigned U.S. patent application Ser. No. 08/021,123, the transponders are typically activated from their sleep modes by the presence of a threshold level of RF energy. Once activated a typical transponder might consume approximately 50 times more power than a transponder in its sleep mode.

SUMMARY OF THE INVENTION

Thus in the presence of a continuous, spurious noise source a transponder battery might be completely discharged—possibly without the possessor of the transponder even being aware of this discharge. Disclosed is a system and method for avoiding the discharge of a battery or otherwise excessive power consumption by a transponder in the presence of a spurious noise source. In a described embodiment, the transponder renders itself immune to activation by the presence of RF energy for some period if the transponder does not receive a proper wake-up message within an activation period.

The advantages realized by this system and method include power savings, which is especially important for battery powered transponders. The transponder further might be less immune to tampering by an unauthorized entity because the transponder would only receive messages for short bursts of time and would not respond to any messages during the period for which the transponder sleeps after an invalid activation. The duration for which the transponder is unresponsive to activation by RF energy in one embodiment is dependent upon the duration that the transponder is exposed to the spurious RF energy.

In the preferred embodiment of the present invention within a vehicle travelling on a vehicle lane is a transponder. The transponder receives the interrogation signal from the transmitter of the interrogator and can reply to the interrogator by backscatter modulating a continuous wave input from the interrogator or another source. A receiver of the interrogator then decodes the backscatter modulated signal and may relay the information contained in this signal to a control circuit which, for example, might log the information into a memory. A number of transponders can be polled separately by interrogators associated with each vehicle lane.

The principles described in connection with this invention can be applied to non-AVI systems as well as AVI systems. For example, the toll calculation methods described herein could be used with the inventions of commonly assigned U.S. Pat. No. 5,053,774, U.S. patent application Ser. No. 08/021,123, and U.S. patent application Ser. No. 08/233,839.

BRIEF DESCRIPTION OF THE DRAWINGS

In the drawings.

Corresponding numerals and symbols in the different figures refer to corresponding parts unless otherwise indicated.

DETAILED DESCRIPTION

Figure 1:
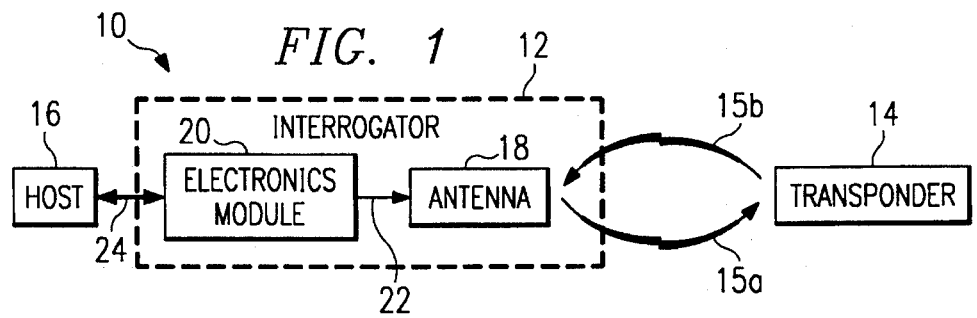
FIG. 1 is a block circuit diagram of an interrogator and transponder arrangement according to the present invention.

FIG. 1 shows a block diagram of an AVI system 10 in which an interrogator 12 communicates with a remote transponder 14 by transmitting an interrogation signal 15a to the transponder 14 in response to which the interrogator 12 transmits back to the interrogator 12 a response signal 15b containing a transponder-unique identifying code (ID). In a typical AVI system, the interrogator 12 will convey this ID code into a host computer (host) 16 for debit against the driver's account. The AVI system 10 preferably includes interrogator electronics 20 for control of the interrogator 12.

Figure 2:
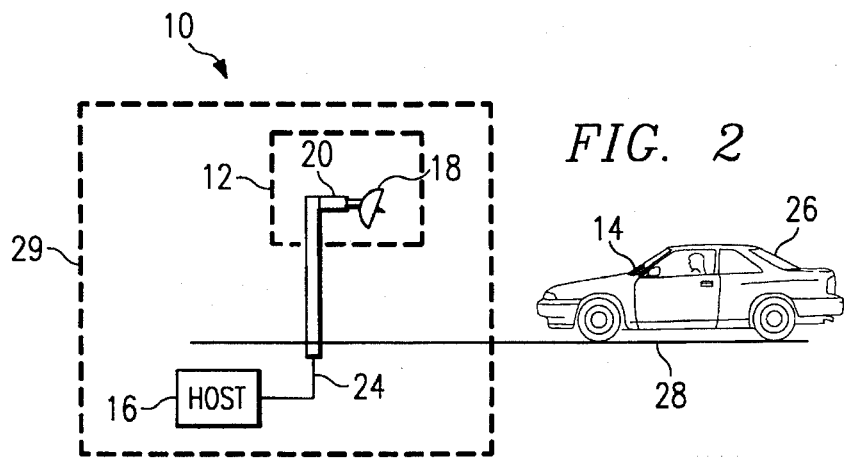
FIG. 2 is a generalized side elevation of a typical installation of an Automatic Vehicle Identification (AVI) System in accordance with FIG. 1.
Figure 3:
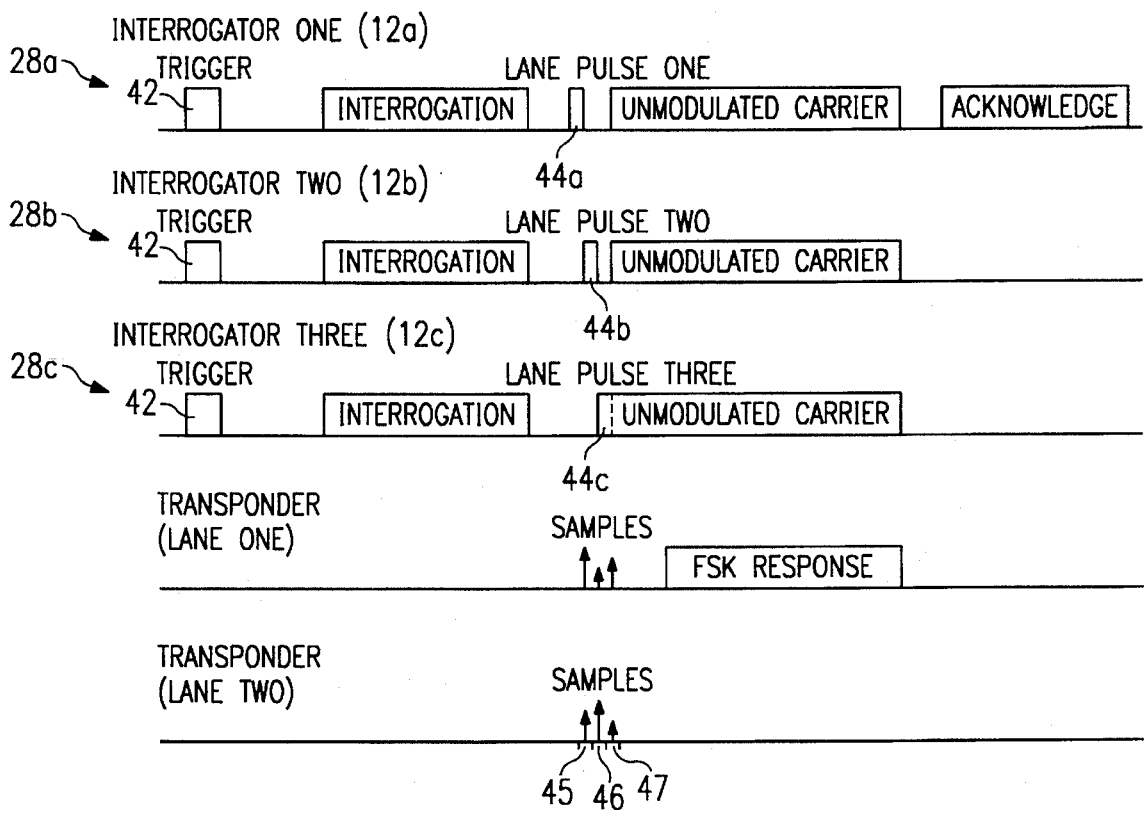
FIG. 3 is a generalized top view of three adjacent traffic lanes using the AVI System of FIG. 1, the figure including a depiction of the timing sequence of a trigger pulse and interrogation signal from the interrogator to the transponder.

Referring to FIGS. 2 & 3, multiple traffic lanes 28 are located at a traffic control point such as a toll plaza 29. Each traffic lane 28 has an associated interrogator 12. Each interrogator 12 initiates and maintains communication via an RF data link with transponders 14 carried on vehicles 26 travelling within the interrogator's 12 associated lane 28. The interrogators 12 may have unique internal electrical parameters such as interrogator lane position, interrogator control parameters, and interrogator reference frequency.

The role of the interrogator 12 in this application is: to trigger or activate a transponder 14, to interrogate or poll the transponder 14 for specific information, and if a valid data exchange has taken place, to acknowledge that fact to the transponder 14. As shown in FIGS. 1–3, the interrogator 12 has an antenna 18 which is preferably mounted above the roadway. Preferably, the antenna 18 will have circular polarization, but advantages may exist which will motivate the use of other choices of polarization including linear and elliptical. Interrogator electronics 20 are connected to the antenna 18 by suitable cable, such as for example an RF coax 22.

The interrogator 12 communicates in a wireless fashion with the transponder 14 by sending on/off keyed modulated signals to the transponder 14. Interrogator 12 then sends a continuous wave RF signal to the transponder 14. The transponder 14 may respond to the interrogator 12 by backscatter modulating the continuous wave RF signal such as described in U.S. Pat. No. 4,739,328 by Koelle, et al. Details of the communication between the interrogator 12 and the transponder 14 will be further described herein. The function of the optional host 16 is to control the operations of the interrogator 12 and the peripheral functions of the toll plaza. Such peripheral functions might include operation of traffic control gates and other lane enforcement equipment such as cameras and traffic lights. Still other peripheral functions might include communications between interrogators 12 and communications with a central office computer (not shown) that might maintain account balance information. Connection 24 between the interrogator 12 and the host 16 as shown in FIG. 1 may be an ethernet, token ring, RS232, RS422 or other connection.

Figure 4:
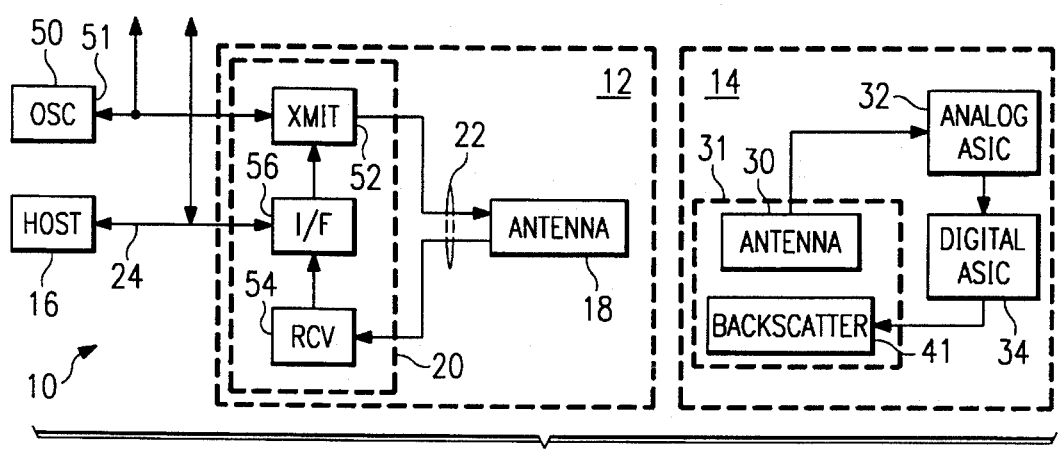
FIG. 4 is a block circuit diagram of the transponder and interrogator arrangement usable in the systems of FIGS. 1–3.

The interrogator 12 of FIG. 1 is housed in two modules: the electronics module 20 and the antenna 18. As shown in FIG. 4, the electronics module 20 contains a transmitter 52, a receiver 54, and a control circuit 56. The interconnection 22 between the antenna 18 and the electronics module 20 consists of a low-loss RF interconnect, which is typically a coaxial cable, and a multi-conductor cable capable of supplying power and control signal information.

FIG. 2 shows a side view of a typical AVI system 10 installation. In this figure a vehicle 26 travels on a vehicle lane 28a–c and approaches the antenna 18. A transponder 14 is located on or within a vehicle 26. Preferably the transponder 14 is mounted to the vehicle front window. In certain applications such as in unusually large vehicles other locations such as on a truck's bumper might be appropriate to reduce variation in height of transponder 14. As shown in the figure, the vehicle 26 carrying the transponder 14 approaches the interrogator 18 at the toll plaza 29. Further details regarding the communication between the transponder 14 and the interrogator 12 will be discussed herein. The components of the interrogator 12 and transponder 14 will also be discussed in greater detail.

FIG. 3 is a top view of an AVI system 10 comprising three lanes 28a–c. The three lanes 28a–c are shown merely for illustration purposes; this system 10 could be applied to one or multiple lanes. Preferably, circuitry is provided in the interrogator 12 for determining in which of the lanes the transponder 14 is located. Claude A. Sharpe's U.S. patent application. Ser. No. 08/021,123, assigned to Texas Instruments, provides one such lane discrimination circuit and method.

FIG. 4 provides a block diagram of the major components of the AVI system 10. First, a transponder 14 will be described with reference to FIG. 4 together with FIGS. 2 and 3. The AVI system 10 preferably comprises directional antennas 18, each antenna 18 focused on an associated vehicle lane 28a,28b,28c. A vehicle 26 or vehicles 26 may travel on each lane 28a–c, each vehicle 26 carrying one or more transponders 14. Each transponder 14 preferably comprises: an antenna 30, an analog or analog/digital ASIC 32, a digital ASIC 34, and a modulated reflector 41. Antenna 30 and modulated reflector 41 may form a single integrated antenna 31. Preferably ASIC 32 and ASIC 34 are integrated as a single ASIC.

With further reference to FIGS. 3 and 4, the transponder antenna 30 is operable to receive RF transmissions from the interrogator 12. The analog ASIC 32 converts a signal supplied by the transponder antenna 30 to a voltage which upon exceeding a threshold activates the transponder 14. According to the preferred embodiment of the present invention, the analog ASIC 32 senses high frequency modulation present upon the signal from the transponder antenna 30 and will only activate the transponder 14 upon presence of that specific modulation frequency. In this way, the transponder is relatively immune being awakened by spurious RF transmissions not originating in the interrogator 12, but only is activated when a particular frequency is transmitted by the interrogator 12. The voltage threshold may be adjustable.

Preferably, each transponder 14 only responds to interrogation signals 15a from the interrogator antenna 18a–c positioned within the lane 28a–c in which the vehicle 26 carrying the transponder 14 is travelling. To accomplish this desired result, the transponder 14 compares a first field strength pulse 44a received from the first directional antenna 18a to a second field strength pulse 44b received from the second directional antenna 18b. The field strength pulse 44a–c received with the greatest signal intensity will be from the interrogator antenna 18a–c that is positioned in the lane 28a–c in which the vehicle 26 carrying the transponder 14 is travelling The transponder 14 may then respond to messages from the appropriate interrogator 12 (i.e., the interrogator associated with the lane 28a,28b, or 28c in which the transponder 14 is travelling). A similar procedure will be repeated between other lane pairs (e.g., 28a–28c, 28b–28c). The transponder 14 is then operable to demodulate a interrogation signal 15a, which in the preferred embodiment is amplitude modulated, from the appropriate interrogator 12. The transponder 14 is then operable to backscatter modulate a continuous wave signal sent by the interrogator 12 to generate the response signal 15b via the modulated reflector 41.

Referring still to FIG. 4, the analog ASIC 32 and digital ASIC 34 typically process the interrogation signal received from the transmitter 52 and formulate the necessary reply data. The digital ASIC 34 then provides a formatted reply data stream to the modulated reflector 41. This ASIC 34 might be a simple digital system using a fixed format, or a more versatile digital processing system which can incorporate a number of options. Many functions can be envisioned for the ASIC 34 to accomplish. Examples of such functions include but are not limited to: data storage, data exchange history, and battery capacity warning. The modulated reflector 41 is modulated by changing its apparent wave length, preferably between one fourth and one half the carrier wave length. When the apparent wave length of the modulated reflector 41 is ½λ, then the antenna 30 reflects a large portion of the incident carrier energy. When the modulated reflector 41 has an apparent length of ¼λ, it reflects very little of the incident carrier. As is well known in the art, a switching of an antenna between ½λ and ¼λ can be accomplished by connecting or disconnecting two ¼λ stubs. For the described embodiment, the change in Reflective Cross Section (RCS) is preferably between 45 cm$^2$ and 100 cm$^2$. By varying the RCS according to the specified format, data is sent from the transponder 14 to the interrogator 12. The transponders 14 are typically self-contained on a small credit card size assembly that is completely portable. Preferably an internal battery is provided to give operating power to the transponder 14. Alternatively the transponder 14 might gain its operating power directly from the RF signal as set forth in commonly assigned U.S. Pat. No. 5,053,774 to Schuermann.

Now that the components of the transponder 14 have been generally described, with further reference to FIG. 4 in view of FIGS. 2–3, a preferred embodiment interrogator 12 will be generally described. The interrogator 12 is located at a specific point where data exchange is desired, such as a toll plaza 29. The AVI system 10 may include a common reference oscillator 50 which generates at its output 51 a reference carrier wave for common synchronization of the interrogators 12. Each interrogator 12 has a directional antenna 18 and a transmitter 52 which transmit a trigger signal 42 (see FIG. 3) of sufficient field strength at a pre-selected distance to trigger or activate a transponder 14 being carried in a vehicle 26 in the interrogator's associated vehicle lane 28.

Still referring to FIG. 4, the transponder 14 comprises power conservation circuitry which acts in a manner later described with respect to FIGS. 5–7 to reduce power use by the transponder 14. If the transponder 14 receives the proper trigger signal 42 (see FIG. 3), and if the transponder 14 is enabled to receive the trigger signal 42 at the time by the power conservation circuitry, communication between the interrogator 12 and the transponder 14 may follow. After transmitting the trigger signal 42, the interrogator 12 transmits an interrogation signal 15a to the remote transponder 14. The interrogation is preferably transmitted using On-Off Keying. Upon completion of the interrogation, the transmitter 52 then transmits a continuous wave RF signal onto the transponder 14 so the transponder 14 may backscatter modulate the continuous wave RF signal to generate the response signal 15b. The interrogator 12 further includes a receiver 54 for reception of the response signal 15b and for separation of the response signal 15b from spurious non-modulated reflections. The interrogator transmitter 52 and receiver 54 operate under control of a control interface circuit 56. The host 16 by way of the control interface circuit 56 directs the transmitter 52 to send the trigger signal 42, followed by the interrogation signal 15a.

To allow proper lane discrimination for a three lane scenario, a first interrogator 12a, second interrogator 12b, and third interrogator 12c send simultaneous first, second, and third interrogation signals 15a, respectively. During a first lane discrimination period 45, first interrogator 12a sends a first field strength pulse 44a and second or third interrogators 12b,12c send no RF energy. During a second lane discrimination period 46, a second interrogator 12b sends a second field strength pulse 44b while first and third interrogators 12a,12c send no RF energy. During a third lane discrimination period 47, a third interrogator 12c sends a third field strength pulse 44c while first and second interrogators 12a,12b send no RF energy. In this manner a transponder 14 travelling in a vehicle 26 in one of the lanes 28a,28b,28c associated with each interrogator 12a, 12b,28c can determine by comparing the amplitude of the pulses 44a,44b,44c received during the first, second, and third field strength periods 45,46,47, in which of the three lanes 28a–c it is travelling. The host 16 by way of the control interface circuit 56 is still further operable to direct the transmitter 52 to send the continuous wave RF signal following the interrogation and to simultaneously direct the receiver 54 to receive the response signal 15b. This sequence can be extended to any number of lanes.

The electronic components 20 of the interrogator 12 will now be described in more detail with respect to FIG. 4. The electronics 20 comprise a transmitter 52 that is operable to send signals to the antenna 18 for the interrogation of transponders 14. Typically transmitter 52 receives signals from the host 16 via the host connection 24. During the transponder reply the transmitter 52 transmits a continuous wave RF signal to the transponder 14, which then backscatter modulates the continuous wave RF signal with the reply data. The receiver 54 detects the reflected energy, which is backscatter modulated by the transponder 14, and separates the modulated signal from the non-modulated reflections. Antenna 18, shown here in electrical communication with the transmitter 52 and the receiver 54, is a directional antenna 18 with a precisely shaped pattern and is used to radiate and receive RF signals covering a portion of each lane during the data exchange between the interrogator 12 and the transponder 14. In the described embodiment, a single antenna 18 is used for both the interrogation signal 15a and the response signal 15b. The antenna 18 is preferably positioned to ensure a constant link between the interrogator 12 and the transponder 14 regardless of site-dependent variations. Also shown is the control circuit or host interface 56 used to communicate with the host 16, which may control all the interrogators 12 at a single toll plaza.

Still referring to FIG. 4, the host interface 56 between the interrogator 12 and the host 16 for certain read/write operations accepts information from the host 16 via the host connection 24 and formats the data for transmission to the vehicle 26 by means of the transmitter 52. Preferably the communications with the host 16 will not occur until after the transmitter 52 has completed an entire read/write transaction with a transponder 14. The host interface 56 also decodes the reply data from the transponder 14 by means of the receiver 54 and supplies this reply data to the host 16. The antenna 18 is preferably weatherproof and designed to operate over the anticipated temperature extremes in its environment.

Referring now to FIG. 4 in light of FIG. 3, for multiple lanes one interrogator 12 will preferably be provided for each lane. All interrogators 12 at a toll location 29 will be coordinated in frequency, power output and antenna pattern to minimize overlap of coverage and interference between adjacent lanes. A different carrier frequency is typically used in each interrogators 12. Alternatively, adjacent interrogators 12 might have differing carrier frequencies to minimize interference as between the adjacent interrogators 12, while non-neighboring interrogators might use the same carrier frequency (i.e., where the interrogators are arranged spatially as #1, #2, #3, #4, #5, and #6, interrogators #1, #3, and #5 might use one carrier frequency while interrogators #2, #4, and #6 might use another carrier frequency). A common carrier frequency might be used in all interrogators 12, such as in a system which provides lane discriminaiton between transponders 14 as as described in the co-assigned Sharpe U.S. patent application Ser. No. 08/021,123.

The receiver 54 of the interrogator 12 detects the backscatter modulated return signal from the transponder 14. The amplitude and phase of the return signal will be completely dependent upon the multitude of reflections which occur from a number of sources. Undesired sources of return include the following: vehicles 26 in the same lane as the interrogator 12 creating beamfilling or non-beamfilling unmodulated returns; vehicles 26 in adjacent lanes 28a,28b, 28c creating unmodulated and backscatter modulated returns; fixed obstacles of unknown composition creating unmodulated returns; and leakage from the transmitter 52 to the receiver 54 during transmission of the continuous wave RF signal to the transponder 14.

Typically, one interrogator 12 is provided for each lane 28 in which a data link is to be enabled. Furthermore, except for site-programmable internal electrical parameters such as lane location, or other controlled parameters, all interrogators 12 are identical and are coordinated in time by a common reference oscillator 50.

The components of the analog ASIC 32 and the digital ASIC 34 will now be described in greater detail below.

Wake-Up Block

Figure 5:
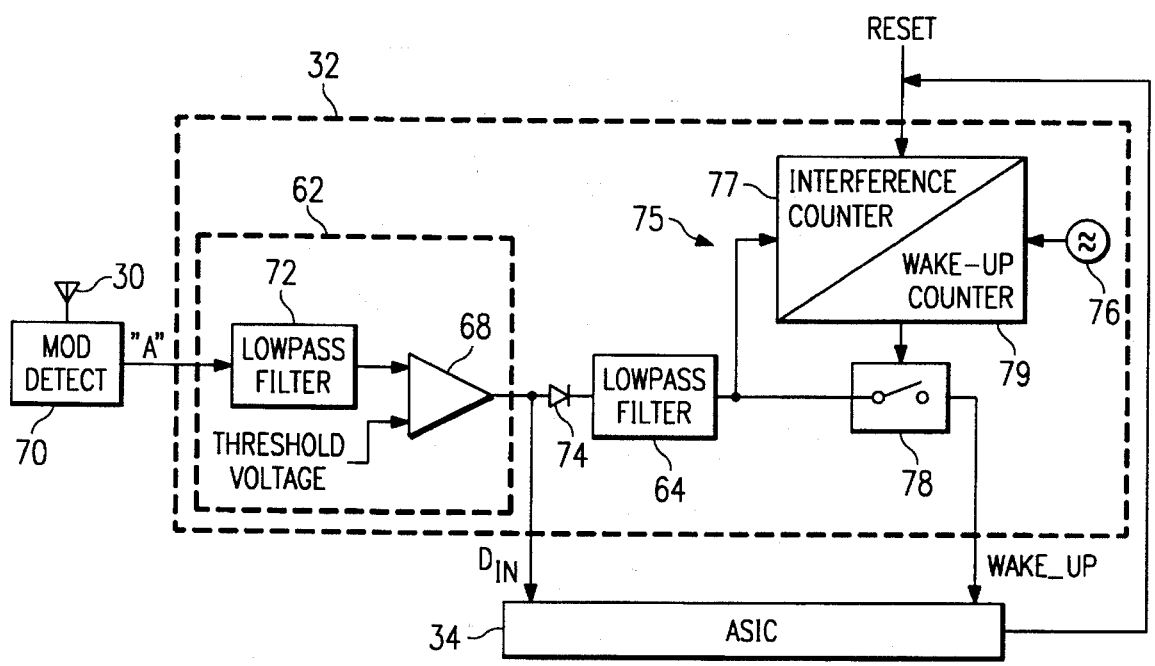
FIG. 5 is a more detailed block circuit diagram of the transponder of FIG. 4, depicting an RF energy detector comprising a rectifier and a lowpass filter.

With reference to FIG. 5, a more detailed diagram is shown of the analog ASIC 32. The interrogation signal 15a is received in the analog ASIC 32 from the antenna 30. Modulation detector 70 acts to remove the carrier signal from the received interrogation signal and pass the remaining baseband signal to first stage circuitry 62. First stage circuitry comprises a lowpass filter 72, which removes high frequency components of the signal from the modulation detector 70. The output of the lowpass filter 72 is further transmitted to a threshold detector 68 that compares the output of the lowpass filter 72 to a reference voltage. The output of the threshold detector 68 will thus be a binary signal, which will be an input signal, $d_{in}$, to the digital ASIC 34 and to a lowpass filter 64.

Typically, the first stage circuitry 62 compares the energy level of the received RF signal to a reference by filtering the received signal in lowpass filter 72 and then comparing this lowpass filtered signal to a reference voltage in threshold detector 68. Other signal characteristics may serve as threshold characteristics. These signal characteristics might be signal duration, spectral content, modulation frequency, or other characteristics. Although this specification refers to digital ASIC 34, the principles described herein apply to any control circuitry or any other circuitry that is desired to be disabled for certain periods of time. Similarly, although the advantages described herein refer to power conservation, this invention might be applied in other situations. For example, it may be desirable to allow a certain radio silence period after a burst of spurious RF energy to ensure that the source of spurious RF energy had indeed been quieted and had not merely been briefly interrupted. This radio silence period could be used by other circuitry or systems which might send control signals or other signals pertinent to suppression of the spurious RF energy source. Alternatively, the radio silence period could be used to synchronize a plurality of interrogators 12 or transponders 14 existing within a common reading range.

With further respect to FIG. 5, the inventive concepts described herein have significant advantages over the prior art in terms of power consumption. It is important to design a transponder 14 that consumes minimal power. By implementing the inventive concepts described herein, the transponder 14 will normally be in a sleep mode, drawing little energy from the battery or from another energy source. The only energy consumed in this sleep mode will be that required by the analog ASIC 32.

Still referring to FIG. 5, a wake up controller 75, which includes an interference counter 77 and a wake-up counter 79 controls the condition—closed/on or open/off—of a switch 78. When the switch 78 is closed/on, signals arriving at the transponder 14 "wake" the transponder 14 from its very low power consumption, or "rest" or "sleep," state and activate the digital ASIC 34. Thereafter, the transponder 14 processes and analyzes the signal as set forth above and hereinafter. When the switch 78 is open/off, incoming signals are not permitted to "wake" the transponder.

As noted, in the "sleep" state, the transponder consumes minimal power. In the "wakened" state, the transponder 14 consumes substantially more power. Unless appropriate steps are taken, spurious signals received by the transponder 14 may improperly have the effect of valid interrogation signals, thereby "waking" the "sleeping" transponder 14, unnecessarily causing the transponder to consume higher power than necessary.

Initially the counters 77 and 79 are set to zero. These zero conditions are achieved when the transponder is initially put to use or when they are reset to that value by the main controller block 140 of the digital ASIC 34. Such reset to zero occurs if and when, during an activation period explained below, the transponder 14 receives a valid RF interrogation signal or receives no RF signal. When the counter 79 is at zero, the switch 78 is closed/on and subsequent incoming signals are capable of "waking" the transponder 14 for processing and analysis thereof. When the counter 79 is non-zero, the switch 78 is open/on and incoming signals are incapable of "waking" the transponder 14.

Figure 6:
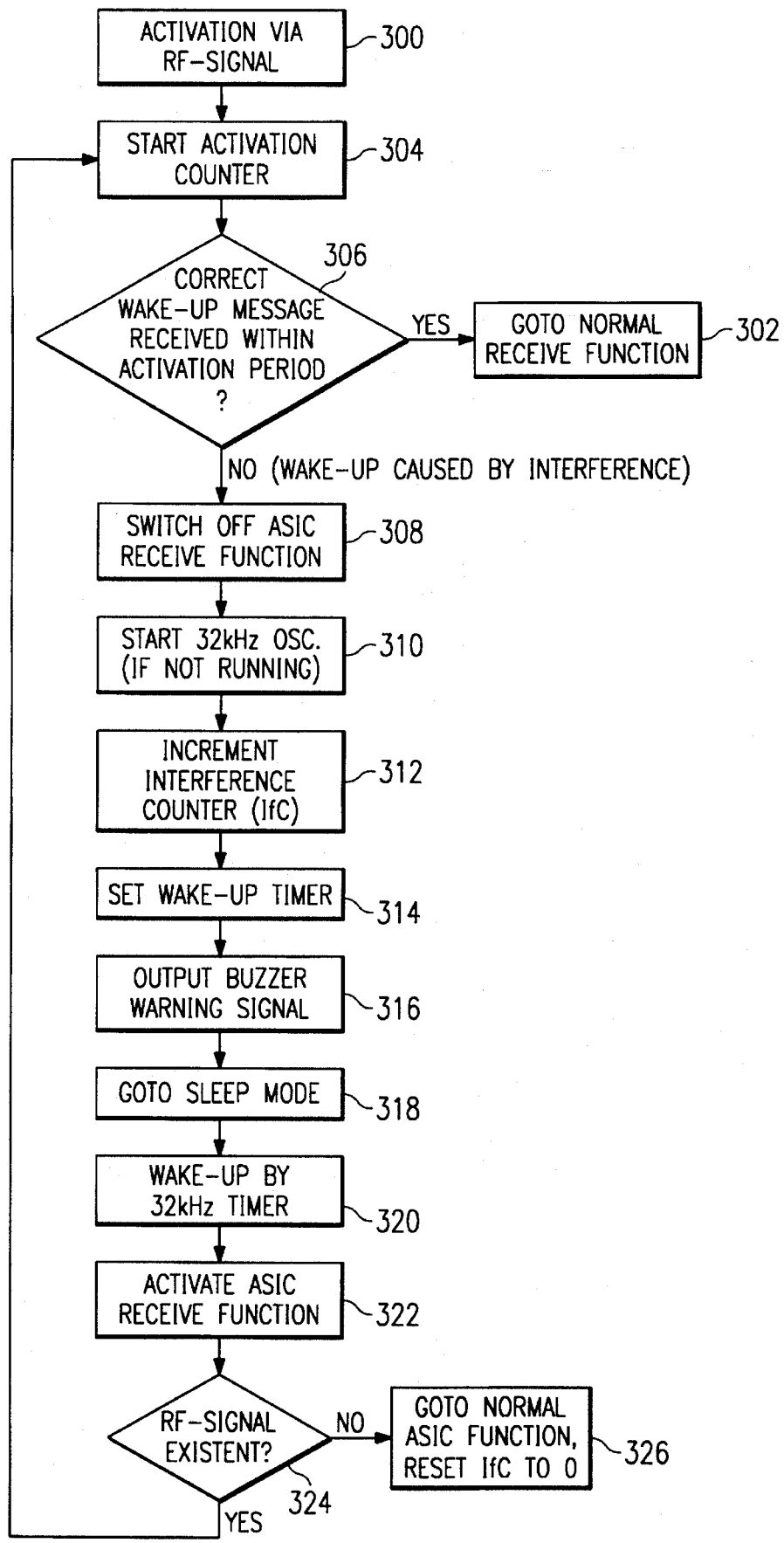
FIG. 6 is a flowchart describing a method of reducing power consumption according to an embodiment of the present invention.

As described hereafter with regard to FIGS. 6 and 7, if the signals received by the transponder 14 are spurious, the initial count or value $N_I$, of the counter 77 is incremented or increased by a count or value N, which is based on the duration T, of the spurious signal S so that its total count or value $N_T$ is equal to $N_I+N_S$. If the initial count in the counter 77 is zero, a spurious signal results in the total count reaching a value proportional to its duration. If the initial count in the counter 77 is not zero, a spurious signal results in a count which is the sum of the non-zero initial count and a count which is based on the duration of the spurious signal. The relationship of $N_s$ to $T_s$ may be linear, i.e., $N_s=kT_s$, where k is a constant. These two variables may also be related in a non linear fashion, i.e., more generally, $N_S=f(T_s)$.

The count or value C of the counter 79 is based on the total count N, in the counter 77. C may be linearly related to $N_T$, i.e., $C=kN_T$, or may be otherwise related, i.e., $C=f(N_T)$. When the count C is a non-zero value, the counter 79, clocked by an oscillator 76, decrements or decreases from such non-zero value to zero. This decrementation occurs during a time T, which constitutes a deactivation period for the transponder 14 and its digital ASIC 34, since until the count of the counter 79 is zero, the switch 78 is open/off.

Following decrementation by the counter 79 to zero, the switch 78 becomes closed/on. If either a valid interrogation signal or no signal is presented to the transponder 14 while the switch 78 is closed/on, the counter 77 is reset to zero thereby, as noted above, and the transponder 14 thereafter functions as set forth herein. If a spurious signal is presented to the transponder 14 while the switch 78 is closed/on, the initial count in the counter 77 is incremented to a higher value which produces a count in the counter 79 based thereon. The resulting longer decrementation time T also renders the transponder 14 inactive for a longer deactivation period.

The foregoing causes the transponder 14 to remain inactive for times having durations which are related to the duration of spurious signals. In this way, increases in the power consumption of the transponder 14 due to spurious signals are minimized. In some embodiments, it may be desired to set the count in the counter 79 to a fixed value from which the counter 79 decrements for a fixed time T upon the counter 77 assuming any non-zero value. Thus, the deactivation period of the transponder 14 may either be variable and related to the duration of one or more of a series of spurious signal occurrences, or be fixed to a selected duration.

FIG. 6 shows a flow chart for a method of power conservation in accordance with this invention. Initially, at block 300, the switch 78 would be in a closed condition and the interference counter 77 and wake-up counter 79 would be set to zero. At this point, if sufficient RF energy is received at the antenna 30, a wake-up signal passes from the low pass filter 64 through the switch 78 to wake-up or activate the digital ASIC 34. At block 304, the transponder 14 begins a procedure by which it monitors the received RF signal for proper interrogations 15a from an interrogator 12. The digital ASIC 34 starts an activation counter 230. This activation counter 230 sets a window (activation period) during which the digital ASIC 34 monitors the received RF signal from the comparator 68 for a proper interrogation signal 15a. The details of an exemplary interrogation signal 15a or "POLL message" is described below under the heading "ASIC COMMAND STRUCTURE AND PROTOCOL." At the end of the activation period, the digital ASIC 34 performs according to the decision block 306. If a correct interrogation signal 15a is received in the transponder 14 during the activation period, the transponder 14 can enter its normal mode (block 302) with the digital ASIC 34 operable to receive further interrogation signals 15a and to initiate RF responses 15b. Even while the transponder 14 is in its normal mode, to minimize power consumption the digital ASIC 34 is preferably in its sleep mode until it receives a wake-up signal from the wake-up controller 75.

If a correct interrogation 15a is not received during the activation window, then the RF energy must have been a spurious signal from an unwanted source. The transponder 14 will therefore enter its power saving mode. At block 308, the transponder 14 becomes impervious during the power saving period to any further received RF energy. At block 310 if the oscillator 76 is not already oscillating, it will be started at this time. The output of this oscillator 76 feeds the clock input of wake-up counter 79.

At block 312, the interference counter 77 is incremented by control circuitry within the wake-up controller 75. The wake-up timer 79 at block 314 is set to some constant multiplied by the value stored in the interference counter 77. At block 316, an audio output is made through a buzzer 212. This buzzer warning signal serves to inform the driver of the automobile 26 that the transponder 14 will not respond to further RF interrogations for a certain period. During this time, the driver may not enter a new toll area using the automatic vehicle identification system 10. Optionally, the buzzer warning could be replaced or supplemented by another means of warning such as visual display.

At block 318, the digital ASIC 34 enters the power saving mode. The digital ASIC 34 will remain in the "sleep" mode and the analog ASIC 32 will not send any "wake-ups" to the digital ASIC 34 until the wake-up counter 79 has decremented to zero. To this end, switch 78 is held open by the wake-up counter 79 to prevent wake-up signals from reaching the digital ASIC 34. In an embodiment of the invention, switch 78 will remain open until the wake-up counter 79 decrements to a "zero" value. Preferably, the power saving period during which these wake-up signals are prevented from reaching the digital ASIC 34 is approximately ten seconds. At block 322, the wake-up controller 75 again monitors the signal from the antenna 30 for the presence of RF energy. If no RF energy exists upon expiration of the power saving period, the wake-up controller 75 can return the transponder 14 to its normal mode during which the digital ASIC 34 is activated by RF energy at its antenna 30.

At decision block 324 the wake-up controller 75 will monitor the signal from the antenna 30 through the lowpass filter 64. If RF signal energy is still present, the wake-up controller 75 will return execution to point 304. The digital ASIC 34 is activated at block 304 by the wake-up controller so that the activation counter 230, which is preferably a part of the digital ASIC 34 can be re-started. While the activation counter 230 counts down for the activation period, the digital ASIC 34 monitors the data input signal, $d_{in}$, for the presence of an interrogation signal 15a from the interrogator 12. Again at decision block 306, if no proper RF interrogation 15a is received, the wake-up controller 75 will ignore subsequent RF signal energy until the wake-up timer 79 counts down completely. Through this loop at block 312 the interference counter 77 has again been incremented. In block 314, the wake-up counter 79 will be set again to a value corresponding to the value in the interference counter 77 multiplied by some constant. For example, the second time through the loop, the interference counter 77 would have a value of 2 instead of 1 as in the first loop. Therefore, the "wake-up" counter 79 will be loaded with a duration twice as long as in the prior loop. In this manner, the duration during which the wake-up function to the digital ASIC 34 is disabled will be dependent on the duration of the spurious RF interference signal(s) received by the transponder 14. Preferably the duration of this power saving mode will increase with the duration of the spurious RF interference up to a specified limit (e.g., 5 minutes).

Figure 7A:
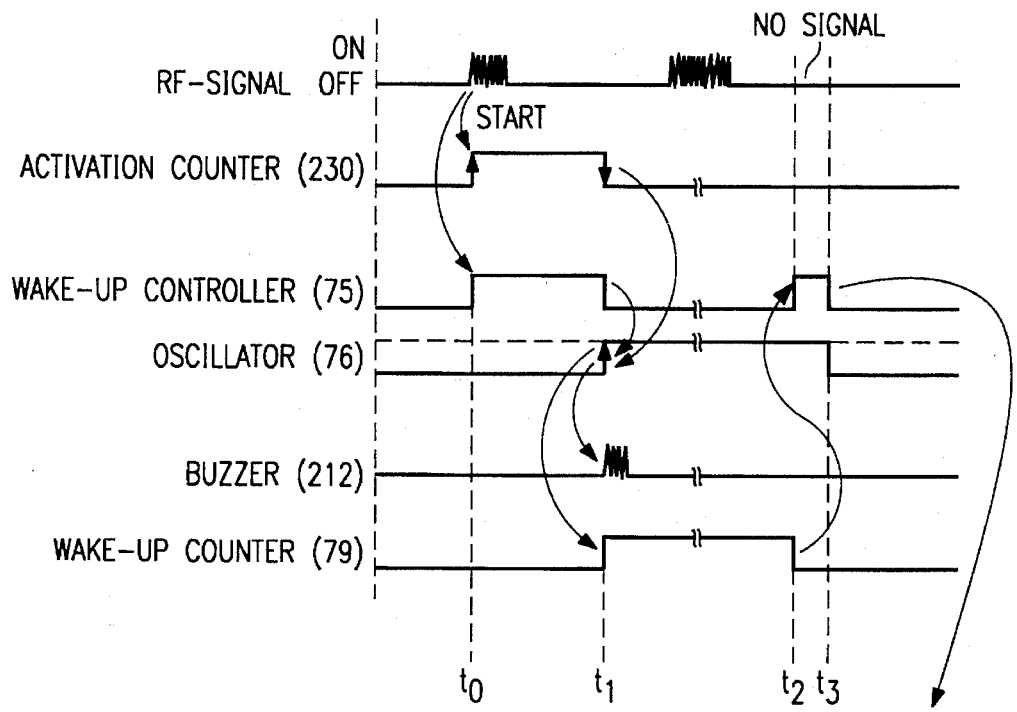
FIGS. 7a–c are timing diagrams for the the transponder as shown in FIGS. 5–6.
Figure 7B:
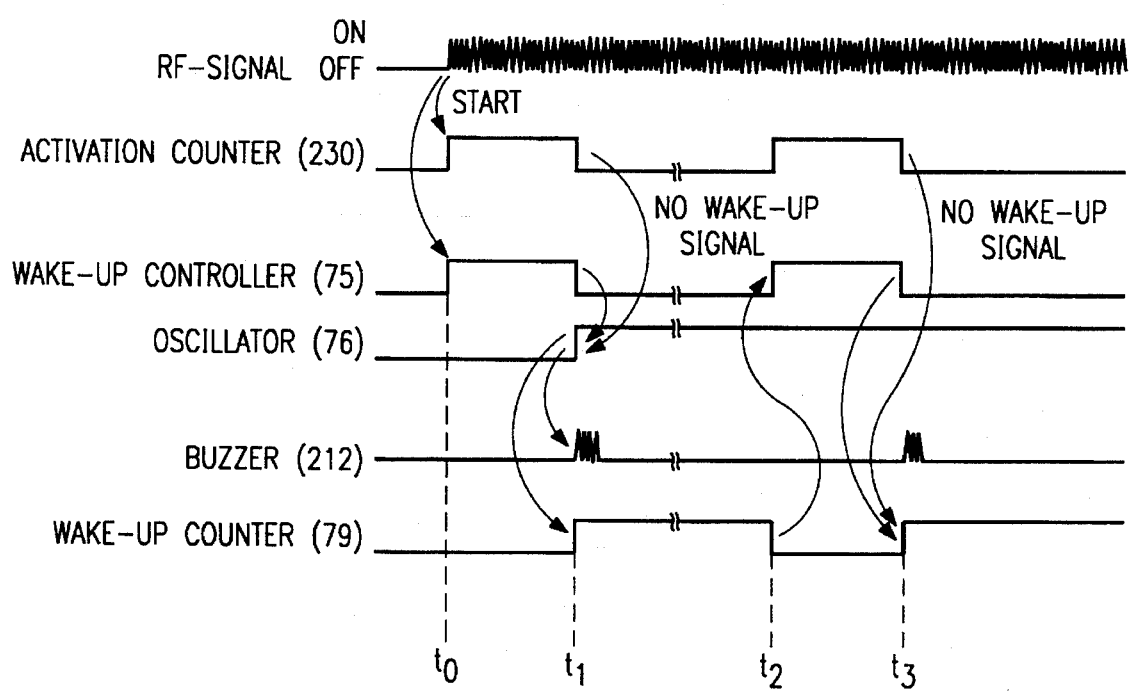

Referring now to FIGS. 7a and 7b, timing diagrams are shown corresponding to two conditions in which the power saving methods according to the present invention may be invoked. In FIG. 7a, a spurious RF signal is shown, beginning at time $t_0$. The spurious RF signal of FIG. 7a is of a relatively short duration. In this condition, the wake-up controller 75 passes the wake-up signal from the lowpass filter 64 to the digital ASIC 34. The digital ASIC 34 then is activated at time $t_0$ by the presence of this RF energy. Also at time $t_0$, the digital ASIC 34 starts the activation counter 230. If the digital ASIC 34 detects no proper RF interrogation 15a within the activation period set by the activation counter 230, the wake-up controller 75 is so notified at time $t_1$ by the main controller block 140 holding the reset line (not shown, see FIGS. 8 and 11) low. The wake-up controller 75 then increments the interference counter 77 at time $t_1$ as shown at block 312. In FIG. 7a, no proper interrogation was received in the digital ASIC 34 and the reset line was not held low. The interference counter 77 is incremented, and if the oscillator 76 is not already oscillating, it will be activated at this time. As mentioned, buzzer 212 may sound at time $t_1$ to alert the driver to the presence of the RF interference. With this knowledge, the driver may elect not to enter toll areas since the automatic vehicle identification system 10 will be inoperable for the power saving period. Alternatively, the transponder 14 may have a "set active" button (not shown), which switches the transponder 14 into a normal operation mode after pressing it. In this manner the driver can override the power saving feature and enter the toll area with knowledge of the presence of the RF interference.

Assuming the driver does not override the power saving feature, wake-up counter 79 begins counting down the power saving period during which the transponder 14 will be unaffected by any type of RF signals, spurious or otherwise, and during which the digital ASIC 34 will be inactivated to conserve energy. The duration that the wake-up counter 79 blocks wake-up signals to the digital ASIC 34 is preferably related to the value of the interference counter 77. At time $t_2$, the wake-up counter 79 has decremented to zero and alerts the wake-up controller 75 to check the status of the RF signal. If no RF signal (proper or spurious) is present at this time ($t_2$), the interference counter 77 is reset and the transponder 14 enters its normal mode at time $t_3$.

FIG. 7b illustrates the condition in which a spurious RF signal of a more enduring nature is present (such as when the transponder 14 is positioned near a transmitter for another service, transmitting at the same frequency, or when the transponder is subjected to two or more overlapping spurious RF signals). In FIG. 7b, as in FIG. 7a, the wake-up controller 75 activates the digital ASIC 34 at time $t_0$. Also at time $t_0$, the digital ASIC 34 starts the activation counter 230. Again, the special power saving mode will be entered at time $t_1$ if the digital ASIC 34 does not detect a proper RF interrogation 15a within the activation period. Preferably the activation period might last approximately 200 ms. Wake-up counter 79 again counts down the power saving period during which the transponder 14 will be unaffected by any type of RF signal, spurious or otherwise, and during which the digital ASIC 34 will be inactivated to conserve energy. At time $t_2$, the wake-up counter 79 has decremented to zero and alerts the wake-up controller 75 to check the status of the RF signal. As shown in FIG. 7b, if an RF signal is present at this time ($t_2$), the digital ASIC 34 will be re-activated to start the activation counter 230 and to monitor the received signal for proper interrogations 15a. If at time $t_3$, the activation period has passed with no proper interrogation 15a, then the interference counter 77 will be incremented. The count in the interference counter 77 will now be greater than it was at time $t_1$ in the previous pass through the power saving loop. At time $t_3$, wake-up counter 79 begins counting down the new power saving period, which will be preferably be longer than the prior power saving period in proportion to the increase in value of the wake-up counter 79. For example, if at time $t_1$ the value of the interference counter 77 was "1" and the power saving period was 10 seconds, then at time $t_3$ the value of the interference counter 77 may be "2" and the power saving period may be 20 seconds. During subsequent loops, the interference counter 77 may be incremented each time RF energy was present at the end of the power saving period—up to some limit (perhaps 5 minutes, for example). At any time, if the transponder 14 has been removed from the presence of the RF energy the interference counter 77 may be reset to zero and the transponder 14 may enter its normal mode (block 326 of FIG. 6) where little energy is consumed but the digital ASIC 34 may be activated at any time by the presence of RF energy. Once activation again occurs, the method described above with respect to FIGS. 6 and 7 will repeat from the beginning (block 300 of FIG. 6).

Figure 7C:
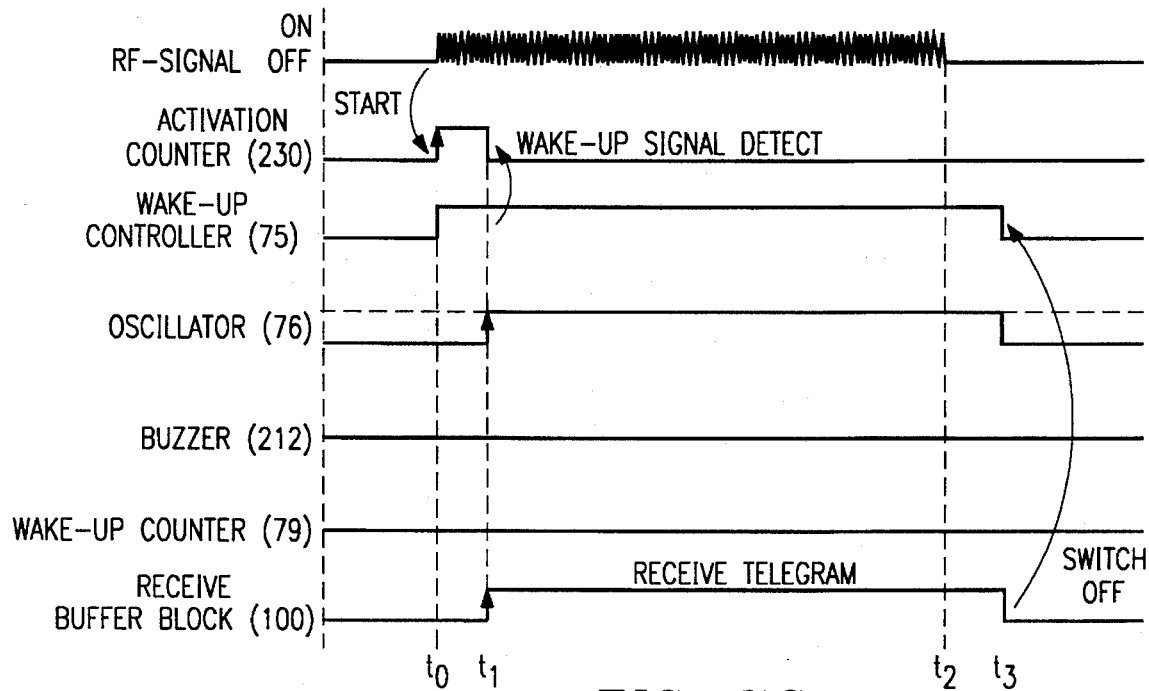

FIG. 7c shows a timing diagram for the AVI system 10 when a proper RF interrogation is received. At time $t_0$ the transponder 14 is activated, this time by a proper RF interrogation signal from the interrogator 12. The activation counter 230 will begin counting until at time $t_1$ the transponder 14 identifies the RF signal as a proper RF interrogation. At that time ($t_1$), the transponder 14 will receive the RF signal in its receive buffer block 100 (see FIG. 8). Upon termination of the RF interrogation signal at time $t_2$, the receive buffer block 100 (see FIG. 8) will continue processing the received signal together with the main controller block 140 (see FIG. 8) until time $t_3$. At time $t_3$, the data received in the RF interrogation has been transmitted to the main controller block 140 or to the main memory block 148. Following time $t_3$, the transponder 14 may enter its normal mode where little energy is consumed but the digital ASIC 34 may be activated at any time by the presence of RF energy (block 326 of FIG. 6).

Figure 8:
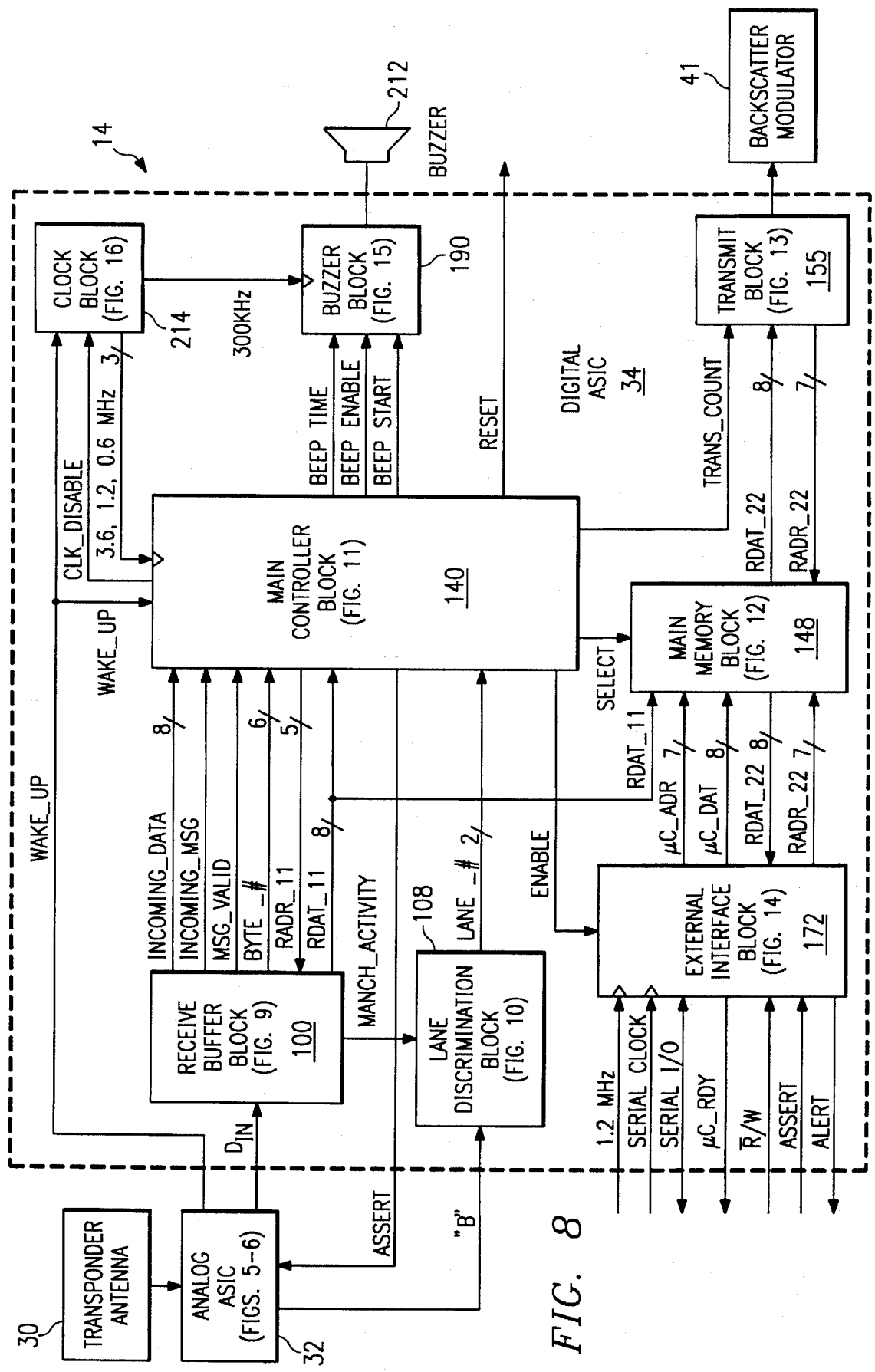
FIG. 8 is a block circuit diagram showing the interconnection of various function blocks of the Application Specific Integrated Circuit (ASIC) of FIG. 5.

FIG. 8 illustrates an overview of the functional blocks 100,108,140, 148,155,172,190,214 within an embodiment of the digital ASIC 34. Within the digital ASIC 34, a clock block 214 receives a wake_up signal from the analog ASIC 32, and thereupon begins to generate clock signals, preferably at 3.6 MHz, 1.2 MHz, 0.6 MHz, and 0.3 MHz. These clock signals are transmitted to the above functional blocks, including at least the main controller block 140. The clock block 214 preferably continues generation of the clock signals, regardless of the status of the wake_up signal received from the analog ASIC 32, until receiving a clk_disable signal from the main controller block 140. Once the RF signal level is removed and the main controller block 140 is in the idle state (i.e., the main controller block 140 has completed all its necessary operations), it will signal the clock block 214 via the clk_disable signal and 0.5 ms later the clock block 214 will disable oscillation of all the clocks. The digital ASIC 34 will remain deactivated until the next RF signal of proper level is detected and the analog ASIC 32 sends another wake_up signal. The nature of CMOS digital logic is that it draws power only when changing states, or to a lesser degree when it is being simply being clocked; therefore, the static current drain of all the digital CMOS logic with the clocks will be very small (in the nano amp range).

Still referring to FIG. 8, the receive buffer block 100 receives a data-bearing signal, $d_{in}$, from the analog ASIC 32. The receive buffer block 100 decodes this signal autonomously from the main controller block 140 and is operable to transmit received data to the main controller block 140 or to main memory block 148. The decoded signal can be received by the main controller block 140 without buffering via the signal, incoming_data. Alternatively, the decoded sinal can be stored and buffered in the receive register 122 (not shown, see FIG. 9) and accessed by the main controller block 140 sending an address signal radr_11. The data output rdat_11 of the receive register 122 (see FIG. 9) may be received directly by the main controller block 140, or it may be received by the main memory block 148 for storage therein. The receive buffer block 100 preferably also provides an incoming_msg signal to notify the main controller block 140 that an interrogation is being received. Furthermore, the receive buffer block 100 may provide a msg_valid signal to the main controller block 140 to inform it that the interrogation was received without received error. The receive buffer block 100 also might provide a signal, manch_active, to the lane discrimination block 108 to notify the lane discrimination block 108 that the receive buffer block 100 is actively decoding the data-bearing signal, $d_{in}$.

With further reference to FIG. 8, the lane discrimination block 108 is operable to receive $d_{in}$ and manch_activity and determine in which vehicle lane 28 (FIG. 3), the vehicle 26 is travelling. The details of this lane discrimination block 108 is described more fully below and in Claude A. Sharpe's U.S. patent application Ser. No. 08/021,123, assigned to Texas Instruments. The lane discrimination block 108 upon determination of the vehicle lane 28 (FIG. 3) in which the vehicle 26 (FIG. 2) is travelling, may transmit this information to main controller block 140 as the signal, lane_#.

The main memory block 148 shown in FIG. 8 is operable to store data received from the receive buffer block 100 as mentioned above. Further, the main memory block 148 is operable to receive data from an external microcontroller (not shown) via the external interface block 172. This data exchange is via the addressing signal, radr_22 and via the data signal, rdat_22. The main memory block 148 may also receive data sent from the external microcontroller (not shown) via address and data signals, µC_adr and µC_dat, respectively. The main memory block 148 is may be enabled or disabled by the main controller block 140 by the select signal. The external interface block 172 operates as an interface between the main memory block 148 and an external microcontroller (not shown). The external interface block 148 receives an enable signal from the main controller block 140 and a clock signal from the clock block 214. Preferably, the clock signal is 1.2 MHz. In this embodiment, the external interface block 172 communicates with the external microcontroller (not shown) by a serial_clk signal, a serial_I/O signal, and a number of handshaking signals (µC_rdy, R_/W, and ext_assert) which will be described in more detail in the description with respect to FIG. 14.

A transmit block 155 is also shown in FIG. 8. The transmit block 155 operates under control of the main controller block 140 to transmit data in the response signal 15b to the interrogator 14 (not shown, see FIG. 1) by preferably backscatter modulating the data upon a continuous wave RF signal from the interrogator 14 using backscatter modulator 41. The transmit block 155 receives data from the main memory block 148 via the data signal rdat_21 and addresses the main memory block 148 using the address signal radr_21. The transmit block 155 communicates with the main controller block 140 using signals (xmit_data_select, start, xmit_complete, and trans_count) which will be described in more detail in the description with respect to FIG. 14.

Figure 15:
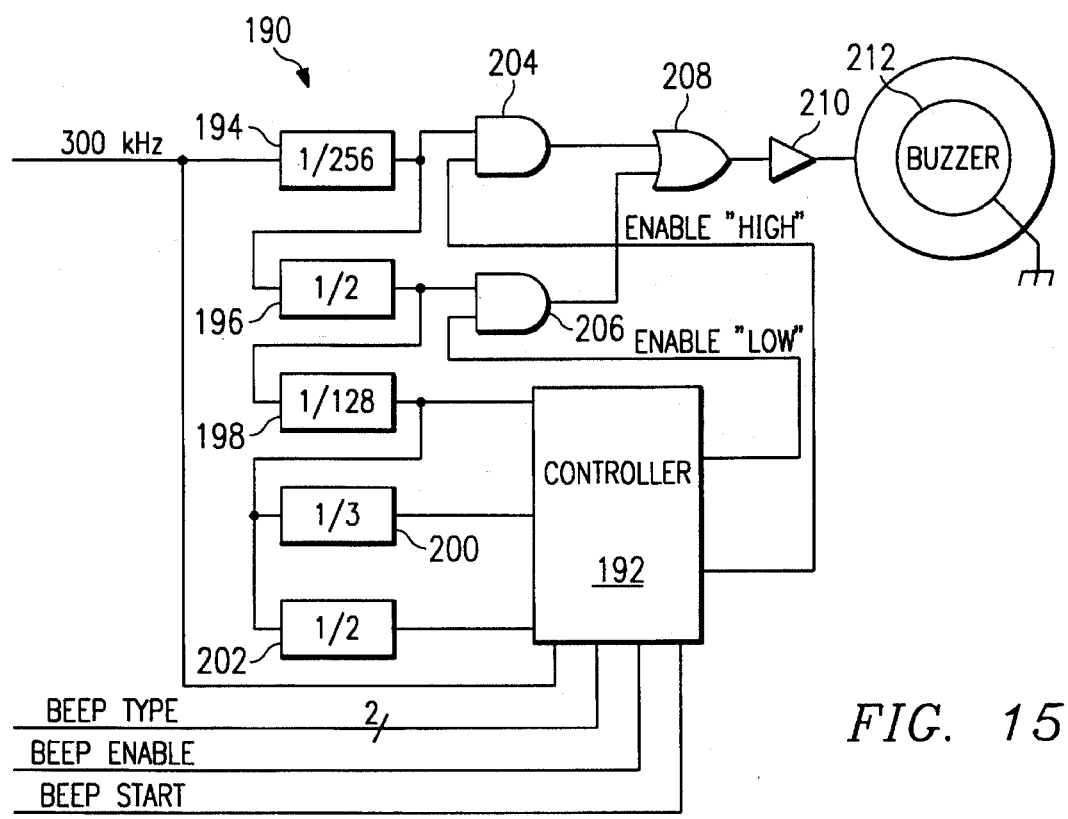
FIG. 15 is a block diagram of the buzzer block preferably within the digital ASIC of FIG. 8.

A buzzer block 190 shown in FIG. 8 operates to transmit indicating tones to an operator via a buzzer 212. The buzzer block 190 operates under control of the main controller block 140. The main controller block 140 sends control signals beep_type, beep_enable, beep_start to the buzzer block 190. These control signals will be described in more detail in the description with respect to FIG. 15.

With further reference to FIG. 8, upon completion of a successful transaction comprising an interrogation and a response in which no data errors occurred, the transponder 14, for example, might enter a 10 second period during which it will not respond to further interrogations having the same agency code as the just-completed transaction. Interrogations received during this nonresponsive period will be compared to the previous agency code, and will not be responded to if the agency code is the same as the previous agency code. If a different, valid agency code is received during the nonresponsive period the transponder 14 may respond to the new interrogation.

Receive/Buffer Block

Figure 9:
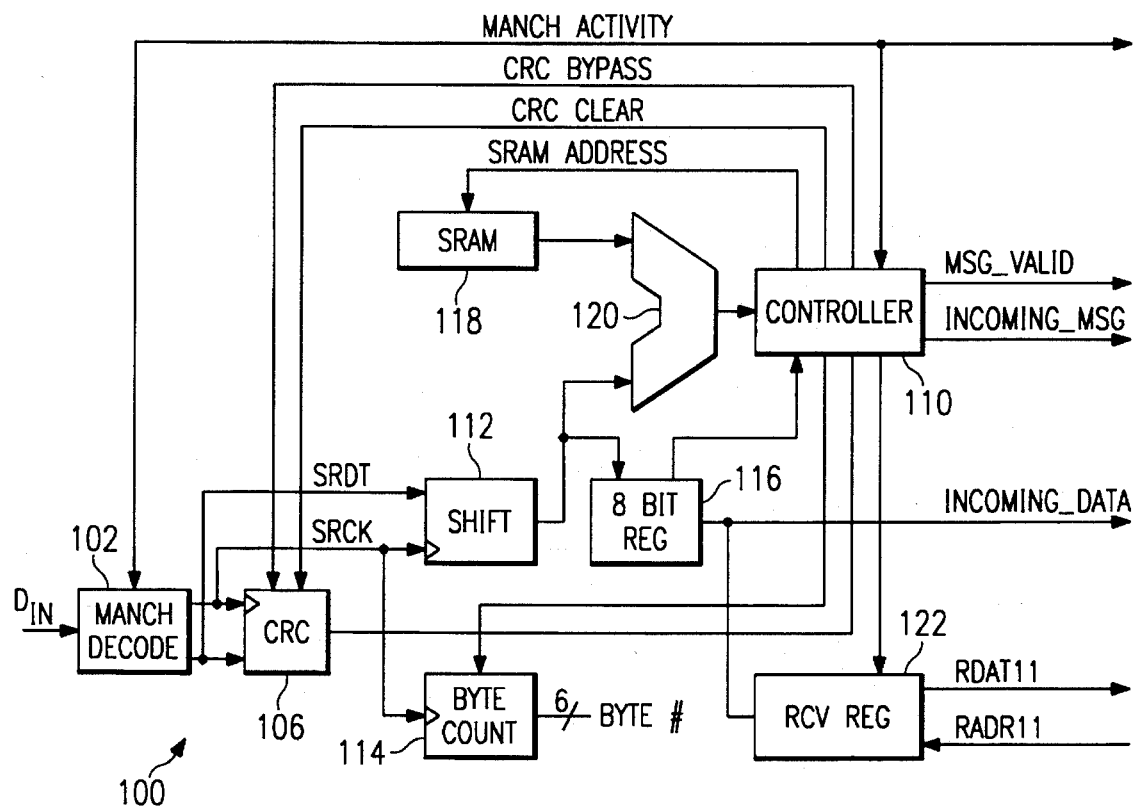
FIG. 9 is a block circuit diagram of a receive buffer block preferably within the digital Application Specific Integrated Circuit (ASIC) of FIG. 8 for receiving signal "A" from the modulation detector.

Referring now to FIG. 9, the components of the receive buffer block 100 of the digital ASIC 34 will be described. The receiver block 100 contains a Manchester decoder 102, CRC-CCITT calculator 106, and a state controller 110. The receiver block 100 will decode transmissions from the interrogator 12, determine in which lane the transponder 14 is located, and calculate the incoming message's CRC. The Manchester decoder 102 receives data-bearing signal, $d_{in}$, from the analog ASIC 32. The Manchester decoder 102 comprises a digital phase-locked loop at 3.6 MHz to enable the Manchester to synchronize to $d_{in}$. The Manchester decoder 102 provides at its output a received serial data stream, SRDT, and a clock signal, SRCK, derived from the data-bearing signal, $d_{in}$. The manchester decoder 102 also provides a manch_activity signal to the lane discrimination block 108 (see FIG. 8). The purpose of the manch_activity signal will be later described with respect to FIG. 10.

Still referring to FIG. 9, the serial data stream, SRDT, is fed into a CRC generator 106. The CRC of the incoming message is calculated using the CCITT polynomial ($X^{16}$+$x^{12}$+$x^5$+1). The receive controller 110 determines which data bits are calculated in the CRC (the overhead bits are not calculated as part of the CRC) and activates the CRC generator 106 to begin calculating the CRC after the overhead bits have all been received. A byte counter 114 is provided to receive the serial data stream and count the number of bytes received. The number of bytes may be counted by incrementing the byte counter 114 with every eighth pulse of the serial data clock and transmitting the count to the main controller block 140 (see FIG. 8). An eight-bit holding register 116 is provided for holding bytes as they are transmitted from the serial-to-parallel shift register 112.

A data comparator 120 is provided so the receive controller 110 can compare data from the serial-to-parallel shift register with that stored in a SRAM 118. In this manner, for example, the tranponder identification might be stored in the SRAM 118 and compared to an ID code gleaned from the serial data, SRDT by the receive controller 110 via the serial-to-parallel shift register 112. Thus the receive buffer block 100 operates autonomously from the main controller 104. The receive controller 110 senses received Manchester-encoded data on the manch_activity line from the Manchester decoder 102. The receive controller 110 is further operable to bypass the CRC generator 106 or to reset the CRC generator 106 using control lines crc_bypass and crc_clear. Upon sensing the start of receipt of Manchester-encoded signals, the controller 110 preferably resets the CRC generator 106 and resets the byte count register 114. The controller 110 may control the receive register 122 to store data from the eight-bit holding register 116.

Lane Discrimination Block

Figure 10:
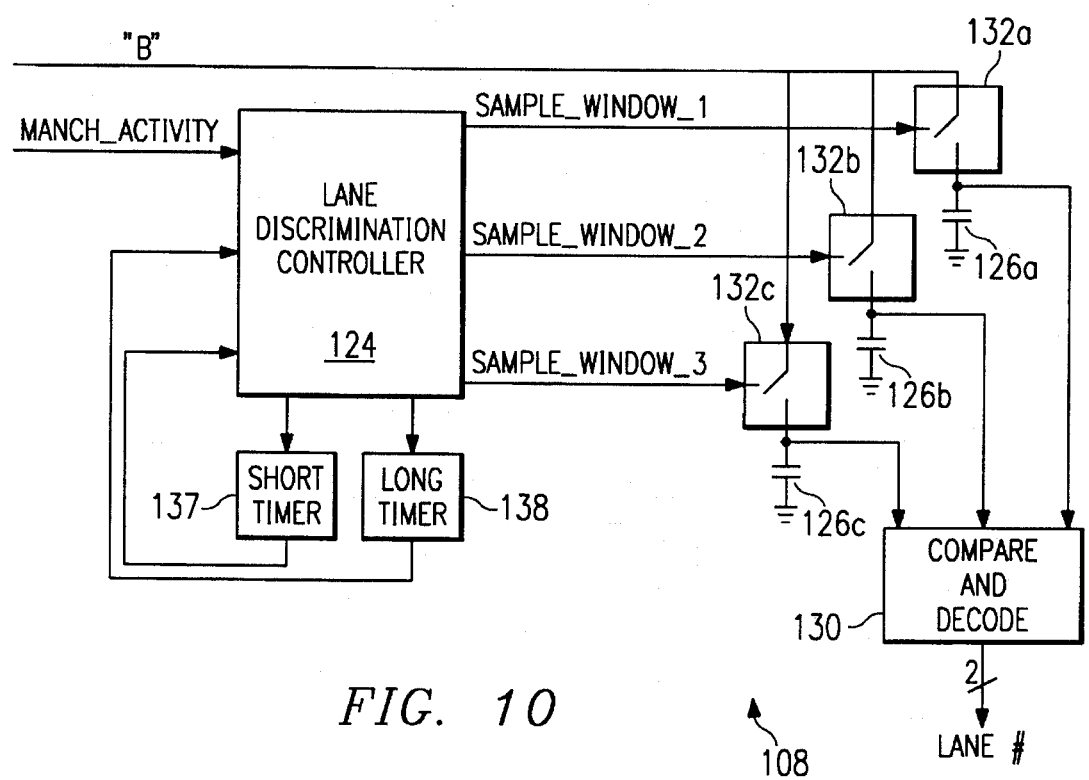
FIG. 10 is a block diagram of the lane discriminator block preferably within the digital ASIC of FIG. 8.

Referring now to FIG. 10, the lane discrimination block 108 includes a lane discrimination controller 124 that samples at three specific times after the interrogation of the transponder 14 by the interrogator 12 is initiated (see FIG. 3). The lane discrimination controller 124 stores voltage samples from node "B" of the analog ASIC 32 (see FIGS. 5, 8) in capacitors 126a, 126b, 126c, whose voltages become inputs to an voltage comparator/decoder 130. The lane discrimination controller 124 samples node "B" during sample periods 45,46,47 (see FIG. 3) to sample field strength pulses 44a–c (see FIG. 3). Switches 132a,134b,132c connect the capacitors 126a,126b,126c, respectively, to the node "B" input voltage (see FIGS. 5, 8). The output of the comparator 130 is sampled a specific time later (after settling) to determine which signal was stronger, and therefore in which lane 28a,28b,28c the transponder 14 is located.

Still referring to FIG. 10, the lane discrimination block 108 is preferably autonomously operable to sample the field strength pulses without need for supervision from the main controller block 104 (see FIG. 8) or other controllers. The lane discrimination controller 124 receives the manch_activity signal from the Receive Buffer Block 100 (See FIG. 8). Upon the detection of Manchester encoded signals (manch_activity=high), the lane discrimination controller 124 starts a long timer 138 to await the completion of the incoming interrogation (see FIG. 3). After the long timer 138 has completed its cycle, the lane discrimination controller 124 begins to monitor the node "B" voltage for field strength pulses 44a–c (see FIG. 3). A short timer 137 provides 3.3 µs sample timing between the pulses. Using this 3.3 µs timing, the lane discrimination controller 124 is properly synchronized to the sample periods 45,46,47 (see FIG. 3). It should be understood that the timing periods described above are merely exemplary and that other periods may be used depending on system design parameters such as the number of lanes being discriminated between and the length of the interrogation and timing pulses.

Main Controller and Comparator Block

Figure 11:
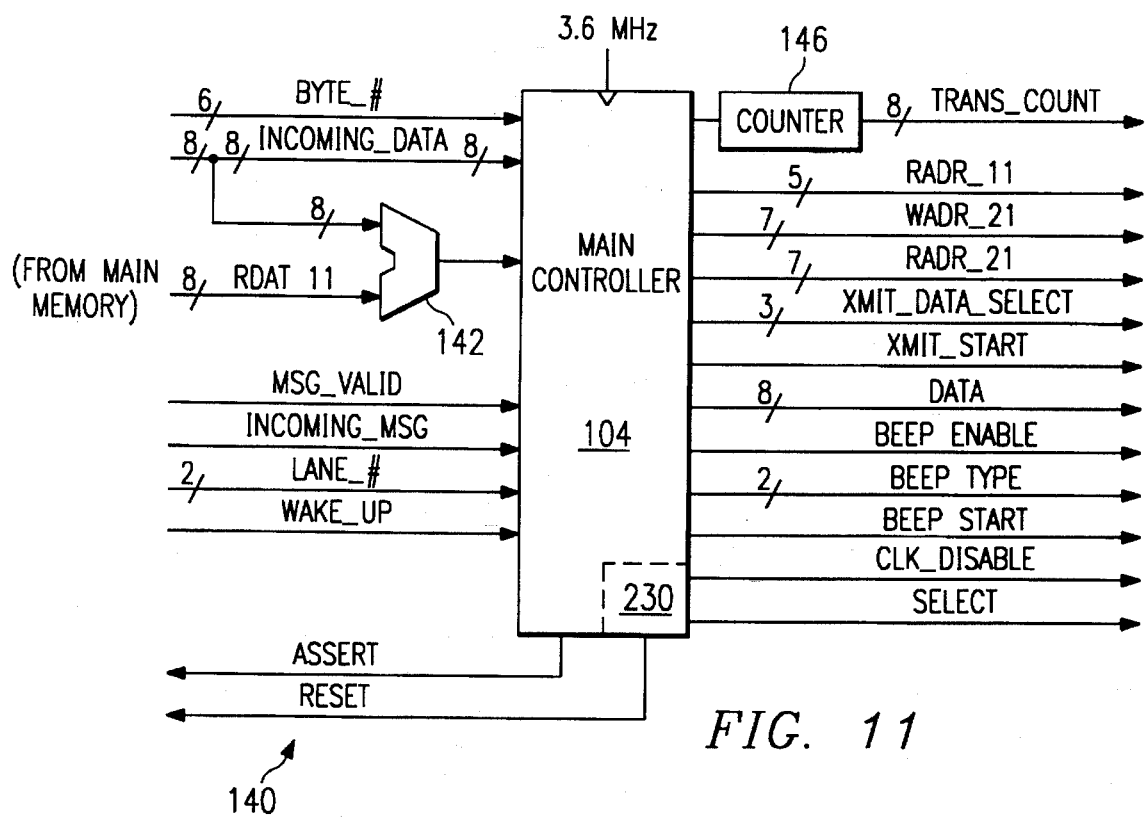
FIG. 11 is a block diagram of the main controller block preferably within the digital ASIC of FIG. 8.

With respect to FIG. 11, the main controller block 140 controls the overall actions of the digital ASIC 34. The main controller 104 is awakened by the "wake-up" signal from the analog ASIC 32 (see FIG. 8). The main controller 104 then makes decisions based on the incoming message content and the current transaction sequence. The comparator 142 takes the incoming messages from the receive buffer 122, verifies the validity of the received message using the calculated CRC, and performs comparisons on the incoming message information. The main controller 104 executes the appropriate command sequence.

Still referring to FIG. 11, a Record Type Code (16 bits) of the incoming interrogation is used to determine the order and type of comparisons performed. This code uniquely defines the transponder message fields and functions permissible. By way of example, hexadecimal numbers 1 through 7FFF may be set aside for transponder message structures and 8000 through FFFF may be dedicated for reader-to-transponder message structures. After the interrogation has been tested for data errors using its CRC, the Record Type Code is examined and the comparator circuit 142 sets flags in accordance with the Record Type Code. The main controller 104 acts upon the flags generated by the comparator circuit 142 and takes the appropriate actions to analyze the data content of the interrogation, to generate the data for the transponder's 14 responses, and to signal the optional external microcontroller (not shown) or to perform ASIC maintenance functions (discussed below under the heading "MAINTENANCE MODE AND MESSAGES"). The main controller 104 also acts to load the main memory block 148 (see FIG. 8) with information by providing addresses to the main memory block 148 in which to store data. Typically the source of this data would be the received interrogation or the external microcontroller (not shown).

With further respect to FIG. 11, transaction counter 146 is an 8 bit counter which is incremented at the end of an acknowledgment message from the interrogator 12 (see FIG. 1) if the transaction was successfully completed (e.g., the interrogator 12 received a valid ID code from the transponder 14). The transaction counter 146, though part of the main controller 104, is addressed within the address space of memory block A. The transaction counter 146 provides a circulating 8 bit number which can be used to track successful toll transactions and maintenance operations for bookkeeping purposes (much as a "check number" keeps track of personal bank transactions). The value of the transaction counter is not normally programmed, but may be reset to zero by resetting the ASIC via the external reset pin or by another method.

As can be seen in FIG. 11, in addition to performing functions relating to the receipt and processing interrogation messages, the main controller 104 acts somewhat as a nerve center for the transponder 14. Many of the control signals pass to and from the main controller 104 to the other function blocks 100,108,140, 148,155,172,190,214. The main controller 104 receives its timing from the exemplary 3.6 MHz clock from the clock block 214. The clock block 214 preferably continues generation of the clock signals, regardless of the status of the wake_up signal received from the analog ASIC 32, until receiving the clk_disable signal from the main controller 104.

Still referring to FIG. 11, the main controller 104 may receive data from the receive buffer block 100 either without buffering via the signal, incoming_data. Alternatively, the decoded signal can be stored and buffered in the receive register 122 (not shown, see FIG. 9) and accessed by the main controller block 140 sending an address signal radr_ 11. The main controller 104 is also operable to store data in main memory block 148 by sending address signal wadr_21 and by enabling main memory block 148 by the "select" signal. Main memory block 148, once so selected, will be operable to receive data directly from the receive buffer block 100 by signal rdat_ 11. The receive buffer block 100 preferably also provides an incoming_msg signal to notify the main controller block 140 that an interrogation is being received. Furthermore, the receive buffer block 100 may provide a msg_valid signal to the main controller block 140 to inform it that the interrogation was received without received error.

With further reference to FIG. 11, the main controller 104 receives a signal, lane_#, from the lane discrimination block 108 to determine in which vehicle lane 28 (FIG. 3) the vehicle 26 bearing the transponder is travelling (see FIG. 2). The transmit block 155 operates under control of the main controller block 140 to transmit data in the response signal 15b to the interrogator 14 (not shown, see FIG. 1) by preferably backscatter modulating the data upon a continuous wave RF signal from the interrogator 14 using backscatter modulator 41. The transmit block 155 receives data from the main memory block 148 via the data signal rdat_21 and addresses the main memory block 148 using the address signal radr_21. The transmit block 155 communicates with the main controller block 140 using signals (xmit_data_select, start, xmit_complete, and trans_count) which will be described in more detail in the description with respect to FIG. 14. The main controller 104 controls the buzzer block by control signals beep_type, beep_enable, and beep_start. These control signals will be described in more detail in the description with respect to FIG. 15.

Memory Block

Figure 12:
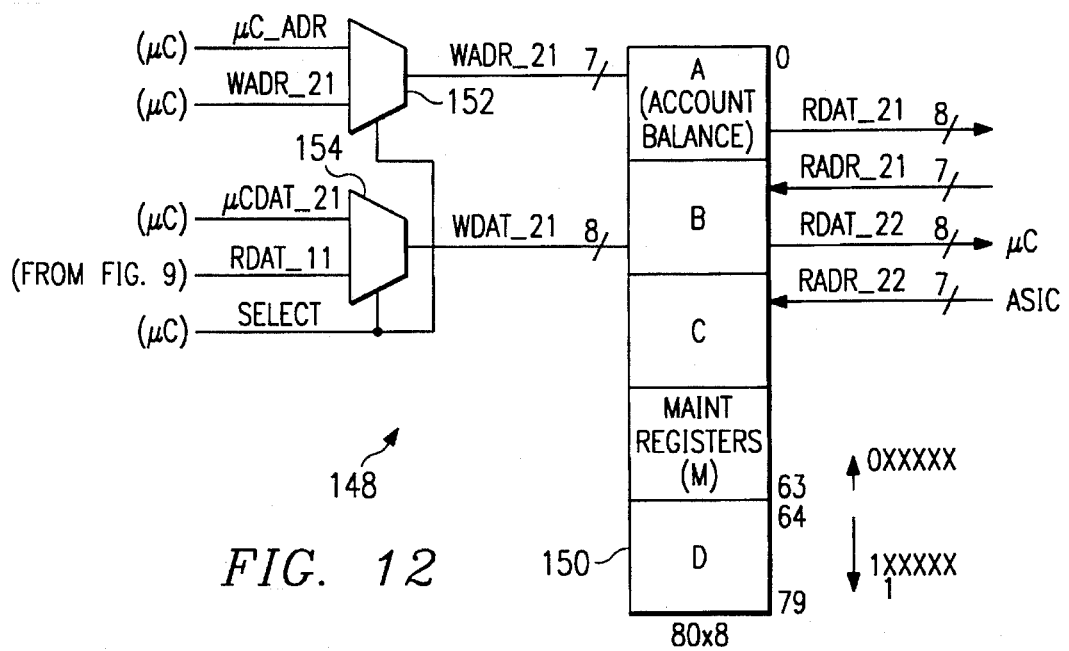
FIG. 12 is a block diagram of the main memory block preferably within the digital ASIC of FIG. 8.

The main memory 150 shown in FIG. 12 has memory blocks A, B, C, D and M. Preferably, each of the exemplary five blocks of memory is available for transmission to the interrogator 12 by the transmit block 155 (see FIG. 8). The memory 150 is preferably a multi-port SRAM, allowing simultaneous read and write operations. Preferably memory 150 is a SRAM having a capacity of 80 bytes, however, memory 150 might be non-volatile memory (e.g., EEPROM, ROM). Further, memories having more or fewer than 80 bytes could be implemented in an AVI system or other systems in accordance with this invention.

Still referring to FIG. 12, the selection muxes 152,154 allow writing to the memory from the main controller 104, from the external microcontroller (not shown) through the external interface block 172. Through the interrogation message, the interrogator 12 may ask the transponder 14 for a 16 byte data transmission of memory block A, B, C, D, or M. As an alternative, the interrogation message might instruct the transponder 14 to send a longer burst of data, such as 32 byte data transmission. For example, a 32 byte data transmission might comprise consecutive transmissions of memory blocks A and B, or of memory blocks A and C, or of memory blocks A and D, or of memory blocks A and M.

The basic function of each of the memory blocks (A,B, C,D,M) might be, for example:

Memory block A: basic accounting information;

Memory block B: law enforcement information;

Memory block C: tollway open-entry information storage;

Memory block D: microprocessor output data transmit buffer;

Memory Block M: maintenance and control functions.
Two special registers are part of memory block A's address space: the transaction counter 146 (not shown, See FIG. 11) and the FLAGS register. Although the transaction counter 146 is part of the main memory's addressing space, because of its logical relationship to the main controller block 140, it is included in FIG. 11 and the description thereof. The second special register in memory block A is the FLAGS register. This 8 bit register indicates the capabilities of the transponder 14 to the interrogator 12, and certain bits are programmed by a service center. The individual bits of the FLAGS register are defined as:

| bit # | externally writable? | function |
|---|---|---|
| 0 | yes | 0 = no balance stored in transponder, 1 = account balance stored in transponder |
| 1 | yes | 0 = account ok, 1 = delinquent account |
| 2 | yes | 0 = no lane discrimination, 1 = lane discrimination enabled |
| 3 | yes | 0 = internal tag, 1 = external tag |
| 4 | no | 0 = OK, 1 = illegally detached from external mounting |
| 5 | yes | (reserved) |
| 6 | no | Battery Consumption Gauge LSB |
| 7 | no | Battery Consumption Gauge MSB |

Bits 0 and 2 are information bits for the interrogator and set at the service center. Bits 1 and 3 reflected enabled or disabled ASIC circuitry, and are set at the service center. Bit 4 is set by the interrogator 12, but may be reset at a service center. Bits 7 and 6 are the high-order bits from the battery consumption meter.

An exemplary structure of memory block A:

| byte # | function |
|---|---|
| 1 | account ID byte 1, MSB |
| 2 | account ID byte 2 |
| 3 | account ID byte 3 |
| 4 | account ID byte 4 |
| 5 | account ID byte 5 |
| 6 | account ID byte 6, LSB |
| 7 | account balance byte 1 (if no uc, these are 0's), MSB |
| 8 | account balance byte 2 (if no uc, these are 0's), LSB |

-continued

| byte # | function |
| --- | --- |
| 9 | (specified) |
| 10 | (specified) |
| 11 | (specified) |
| 12 | (specified) |
| 13 | (specified) |
| 14 | (specified) |
| 15 | FLAGS register |
| 16 | Transaction # register |

The structure of memory block B may be "free-form" or not rigidly specified as is memory block A. The contents of memory block B (16 bytes) may be written at the service center by the toll agency or other authorized entity, but can be read by the reader 12. Memory block B may, for example, contain read-only type information (law enforcement info, license plate number, transaction agency code, etc.).

The structure of memory block C may also be "free-form." The purpose of this memory block is to pass information (such as tollway entry info) from one reader to another interrogator 12. For example, a first interrogator 12 may store information in the transponder 14 by sending data which the main controller block 140 (see FIG. 8) can store in memory block C by sending the appropriate addressing information. Another, subsequent interrogator 12 may then by sending an appropriate Transaction Record Type Cod (such as the Type 3A, described below, under the heading "Transaction Record Type Codes) read the contents of memory block C. By these methods communication may be effected between different interrogators 12.

Memory block D is intended to be used by the main controller 104 as a transmit buffer (16 bytes) for information from an optional external microcontroller (not shown) to a interrogator 12 or a service center. The contents of memory block D (16 bytes) is primarily intended to be loaded by the external microcontroller (not shown). If an external microcontroller (not shown) is not present in the AVI system 10, block D can be used "free-form" as another 16 bytes of information which can be loaded by the service center or interrogator 12, and read by a service center or reader 12. As an alternative to storing microcontroller access functions, block D might be used as additional storage in normal operations even with a microcontroller present.

Maintenance Block Register Functions:

| byte # | function |
| --- | --- |
| 1 | agency code, MSB |
| 2 | agency code, LSB |
| 3 | CONFIGURATION register |
| 4 | Analog ASIC configuration word, MSB |
| 5 | Analog ASIC configuration word |
| 6 | Analog ASIC configuration word, LSB |
| 7 | |
| 8 | |
| 9 | |
| 10 | |
| 11 | |
| 12 | battery consumption gauge byte 1 - LSB |
| 13 | battery consumption gauge byte 2 |
| 14 | battery consumption gauge byte 3 |
| 15 | battery consumption gauge byte 4 |
| 16 | battery consumption gauge byte 5 - MSB |

Transmitter Block

Figure 13:
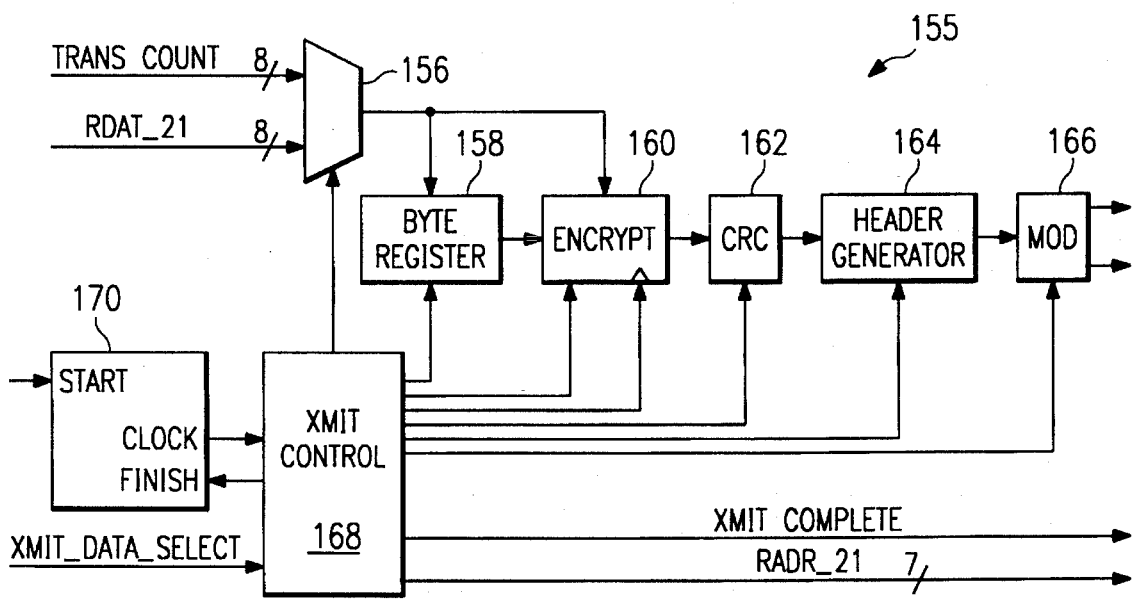
FIG. 13 is a block diagram of the transmit block preferably within the digital ASIC of FIG. 8.
Figure 16:
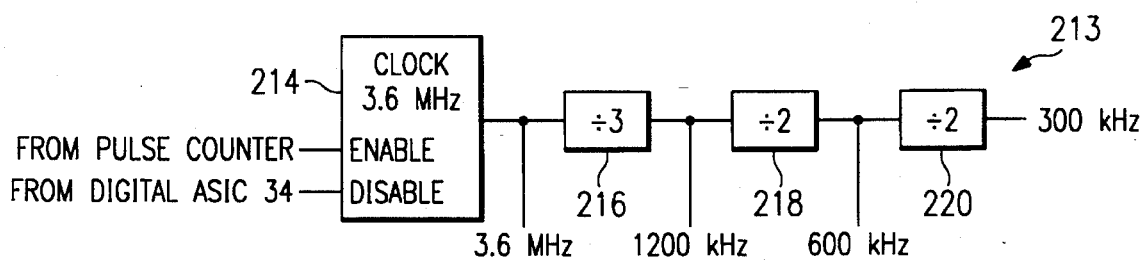
FIG. 16 is a block diagram of the oscillator block preferably within the digital ASIC of FIG. 8.

With reference now to FIG. 13, the transmitter block 155 contains a mux 156, a byte register 158, an encryption circuit 160, a CRC generator 162, a header generator 164, an FSK modulator 166, and a controller 168. The serial data stream to be transmitted is encrypted by the encryptor 160, passed through the CRC generator 162, and transmitted via the FSK modulator 166. Upon being commanded by the main controller block, the transmitter block control circuitry 168 is enabled. The transmitter controller 168 then transmits the "selsyn" signal, which may be used by the receiver 54 within the interrogator 12 to self-synchronize (selsyn) with the transponder 12 response. An exemplary selsyn signal might the binary and hexadecimal values: 10101010 and AA, respectively. Upon completion of sychronization with the interrogator receiver 54, the transmitter controller 168 then signals the main controller 104 for the appropriate memory block data to be clocked in at 300 khz. When the main controller 104 signals the end of data, the CRC circuit 162 clocks out the CRC. Upon completion of the transmission of the CRC bits, the transmitter block 155 enters the idle state and signals the main controller 104 to disable the transmitter clock block 214 for lowest power consumption.

The encryption circuit 160 uses multiple keys. The encryption function may be deactivated at the service center. The CRC generator 162 calculates the CRC using the CCITT polynomial $(x^{16}+ x^{12}+x^{5}+1)$. The data input to the CRC generator 162 is the encrypted data stream. The CRC value is always transmitted as unencrypted information.

Interface Controller Block

Figure 14:
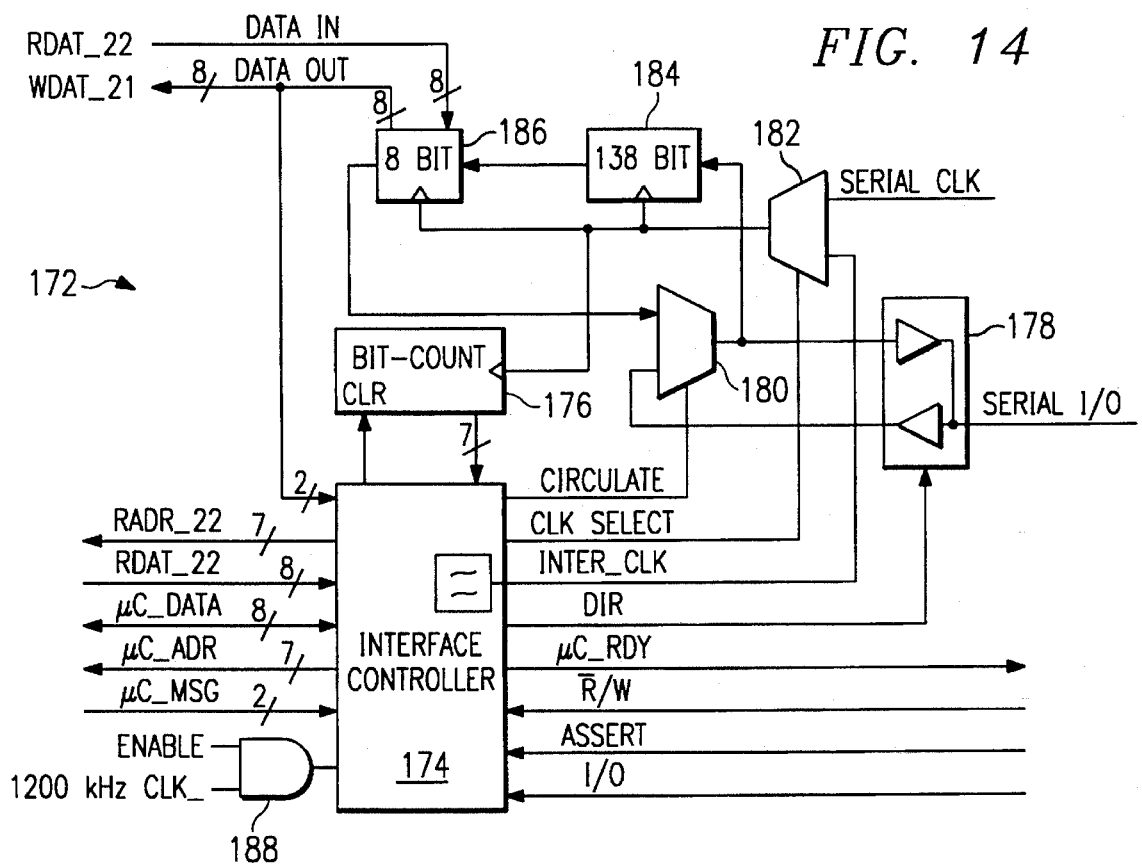
FIG. 14 is a block diagram of the external interface block preferably within the digital ASIC of FIG. 8.

FIG. 14 shows an external controller interface circuit 172. The interface circuit 172 provides flexibility in the transponder 14 design, allowing future upgrades to the system with minimal effort The interface circuit 172 allows an external microcontroller (not shown) to communicate with the transponder 14. The interface controller 174 may be activated by the main controller 104 by the "enable" signal between the two functional blocks (see FIG. 8). When awakened by the external microcontroller, the interface controller 174 senses that the "ext_assert" signal is active and will proceed to communicate with the external microcontroller. The interface circuit 172 overcomes problems with designing the transponder 14 for future compatibility with unknown external circuitry having unknown future interface requirements. In order to allow the unspecified external circuitry or external microcontroller to access the transponder memory 150 at a clock rate of its own choosing, a buffer memory comprising an 8 bit shift register 186 and a 138 bit shift register (146 bit shift register) 184 is provided.

The interface controller 174 forms the heart of the interface circuit 172. In a write mode, the transponder 14 communicates with the external microcontroller. The interface controller 174 receives messages from the main controller 104 via the control line µC_MSG and will wake up the external microcontroller with the signal µC_RDY. Data is loaded from the main memory 150 into the 8 bit shift register 186. Once a byte is loaded in parallel into the 8 bit shift register 186, the 8 bits are then circulated serially into the 138 bit shift register through the mux 180. The function of mux 180 is to allow data to be clocked into the 138 bit shift register 184 from the 8 bit shift register 186 or to allow it to be clocked in from the external microcontroller via the serial I/O buffer 178. As can be seen in FIG. 14, when the "circulate" signal is low-asserted, data passes through the mux 180 from the serial I/O buffer 178. When the "circulate" signal is high-asserted, data passes through the mux 180 from the serial output of the 8 bit shift register 186. Thus, the data can be loaded into the 8 bit shift register 186 in groups of 8 and circulated about into the 138 bit shift register 184 until the message is completely loaded. Once the message is completely loaded, the "circulate" signal is low-asserted. Alternatively, the interface controller 174 may be activated by the external microcontroller by raising the "ext_assert" signal, whether or not the external RF field has activated the transponder 14. In either case, the interface controller 174 sends a seven bit address, RADR_22 to the main memory block 148 so that data can be loaded into or out of the 8 bit register 186 via RDAT_22.

One of the advantages of having an interface circuit interposed between the main controller 104 and an external microcontroller is that by buffering and by design of the clocking to the 146 bit register 186,184 the external microcontroller is free to send its own serial clock signal to mux 182 for clocking data into or out of the 146 bit register 186,184. As shown in the figure, the interface controller 174 directs the mux 182 to pass either this serial clock from the external microcontroller or to pass its own clock to the 146 bit register 186,184. Flexibility thus exists to load and unload data into the register at any practical clock rate of the external microcontroller.

Serial I/O buffer 178 can enable data flow either direction, the direction depending on its single control line, DIR, from the interface controller 174. Further, not only is the external microcontroller capable of awakening the transponder 14 by the "ext_assert" line, the interface controller 174 can awaken the external microcontroller by signaling over the uc_rdy signal output. A bit-count circuit 176 monitors the incoming data stream and serves to orient the interface controller 174 to the start of data in the circulating shift register 184. The function of the interface controller 174 is to read and write 16 bytes of data to/from the optional, external microcontroller and to serially program (configure) the analog ASIC 32.

The interface controller 174 is capable of direct communication with the main memory 150 through the buses µC_MSG, and through the buses RADR_22[0:6] (address), DATA[0:7] (data), and µC_ADR[0:7].

A three bit command word is loaded first into the 8 bit register 186. The three bit command word informs the external microcontroller the nature of the ensuing message. The bytes of information that follow are loaded one byte at a time and then are shifted out and circulated through the mux 180 into the 138 bit shift register. After the ensuing message has been completely loaded, the shift registers 184,186 are clocked until the original two bits are again located at the beginning of the 8 bit register 186. At this time, the clk_select line may asserted so that the serial clock from the external processor can be used to clock the data out of the shift registers 184,186, the control line into the serial I/O buffer 178 is asserted to allow data to be output, and the uc_rdy is asserted to wake up the external microcontroller.

In a first mode, upon awakening, the external microcontroller has the R_/W signal set low. The external microcontroller will then serially shift in the first three bits to determine the nature of the ensuing message. After the external microcontroller has clocked in as many bits as required from the three bit message from the transponder 14, the microcontroller sets its R_/W signal high to indicate that it has completed receiving data. Upon seeing the R_/W signal asserted high, the interface processor sets the serial I/O buffer 178 to input mode, asserts the circulate signal low so data can again be loaded into the shift registers 184, 186 in a circular fashion, and the clock signal is again set to the interface controller 174 so it may again take control of the loading and unloading of the shift register 184, 186.

In another mode, if the external microcontroller has data to send to the digital ASIC 34 it can wake up the interface controller 174 by the "ext_assert" signal. As before, the interface controller 174 sets the clock mux 182 to pass the serial clock from the external microcontroller. In this mode, the R_/W is asserted high. The external microcontroller will then shift data serially directly into the 138 bit shift register 184 and will continue until it has sent the necessary data and until the data has been shifted 146 times to load the first bit of the message into the 8 bit shift register 186. The interface controller 174 can then again take control of the clock by asserting the clk select line low to the clock select mux 182. Data can then be loaded out of the 8 bit shift register 186 into block D the main memory 150. The data is extracted one byte at a time, after which the clock transitions eight times to serially shift a new byte from the 138 bit register 184 into the 8 bit register 186. Unloading and shifting continues until the entire message has been transferred into the main memory 150.

ASIC Command Structure and Protocol

The preferred embodiment ASIC 34 uses the CALTRANS specification for its communications protocol. The CALTRANS specification is specific to many aspects of the message content, and the ASIC command structure complies with the CALTRANS requirements.

The interrogator 12 commands the transponder 14 through the use of 4 bytes: the record type (2 bytes) and the status code (2 bytes). The record type is sent as the first 2 bytes following the header in the POLL and the ACKNOWLEDGE messages, and the status code is included as part of the ACKNOWLEDGE message only.

The record type and status code have different effects upon the ASIC 34 depending upon whether the transponder 14 is an ASIC-only unit or if the transponder 14 has a ASIC 34 plus an external microcontroller. FIG. 14 in connection with the specification herein illustrates the ASIC interface circuitry for interfacing with an external microcontroller.

The use of the CCITT CRC polynomial and "sanity checks" on record types and the message structure assure that the proper toll transactions will occur without error. Should the ASIC encounter an unknown record type or message, it will ignore the information and no action will be taken.

Structure of the record type (all messages):

The record type consists of the first two bytes following the header in each POLL and ACKNOWLEDGE message. It may act as a function in itself, or additional commands may be sent via the use of the status code (in the ACKNOWLEDGE message). The basic function of the record type is to tell the receiver (transponder or Interrogator) how to decode the fields in the message that it has just received, and to deliver to the ASIC an instruction to perform.

The CALTRANS specification requires that a record type code range of 0x0001 through 0x7FFF will be reserved for transponder-to-interrogator messages, and the record type code range of 0x8000 through 0xFFFF will be reserved for interrogator-to-transponder messages.

Transaction Record Type Codes:

The following record types are understood and acted upon by the ASIC (in association with a valid agency code):

(Should on-transponder 14 lane determination be disabled via the FLAGS register, the lane bit in the record type may be ignored and the transponder 14 may will respond to a POLL message regardless of its lane position.)

0x8000 Type 1 POLL message—the transponder 14 is requested to send memory block A in the next RESPONSE message (any lane).

0x8001 Type 2 POLL message—the transponder 14 is requested to send memory blocks A and B in the next RESPONSE message (any lane).

0x8002 Type 3 POLL message—the transponder 14 is requested to send memory blocks A and C in the next RESPONSE message (any lane).

0x8003 Type 4 POLL message—the transponder 14 is requested to send memory blocks A and D in the next RESPONSE message (any lane).

0x8010 Type 1A POLL message—the transponder 14 is requested to send memory block A in the next Lane A RESPONSE message.

0x8011 Type 2A POLL message—the transponder 14 is requested to send memory blocks A and B in the next Lane A RESPONSE message.

0x8012 Type 3A POLL message—the transponder 14 is requested to send memory blocks A and C in the next Lane A RESPONSE message.

0x8013 Type 4A POLL message—the transponder 14 is requested to send memory blocks A and D in the next Lane A RESPONSE message.

0x8020 Type 1B POLL message—the transponder 14 is requested to send memory block A in the next Lane B RESPONSE message.

0x8021 Type 2B POLL message—the transponder 14 is requested to send memory blocks A and B in the next Lane B RESPONSE message.

0x8022 Type 3B POLL message—the transponder 14 is requested to send memory blocks A and C in the next Lane B RESPONSE message.

0x8023 Type 4B POLL message—the transponder 14 is requested to send memory blocks A and D in the next Lane B RESPONSE message.

0x8030 Type 1C POLL message—the transponder 14 is requested to send memory block A in the next Lane C RESPONSE message.

0x8031 Type 2C POLL message—the transponder 14 is requested to send memory blocks A and B in the next Lane C RESPONSE message.

0x8032 Type 3C POLL message—the transponder 14 is requested to send memory blocks A and C in the next Lane C RESPONSE message.

0x8033 Type 4C POLL message—the transponder 14 is requested to send memory blocks A and D in the next Lane C RESPONSE message.

The following record types are defined for the RESPONSE message:

0x0001 Transaction Type 1 RESPONSE

The transponder 14 is responding with memory block A (16 bytes).

0x0002 Transaction Type 2 RESPONSE

The transponder 14 is responding with memory blocks A and B (32 bytes).

0x0003 Transaction Type 3 RESPONSE

The transponder 14 is responding with memory blocks A and C (32 bytes).

0x0004 Transaction Type 4 RESPONSE

The transponder 14 is responding with memory blocks A and D (32 bytes).

The following record types are defined for the ACKNOWLEDGE message:

0xC000 Transaction Type 1 ACKNOWLEDGE message—(transaction successful). The transaction counter 146 is incremented, and the transponder 14 enters a ten second "silence" period. A microcontroller message will be generated. The buzzer will beep 3 short high tones.

0xC001 Transaction Type 2 ACKNOWLEDGE message—(transaction pending). The transponder 14 will respond to the next appropriate POLL message. The status code may contain further instructions. A microcontroller message will be generated. This is essentially a "no action" code.

0xC002 Transaction Type 3 ACKNOWLEDGE message—(open entry-load block C). The 16 bytes following the status code will be written into memory block C. The transponder 14 enters a ten second "silence" period. The status code and the 16 bytes following the status code will be formatted into a microcontroller message (if a microcontroller is present). The buzzer will beep 1 short high tone.

0xC003 Transaction Type 4 ACKNOWLEDGE message—(load block D) The 16 bytes following the status code will be written into memory block D. The transponder 14 enters a ten second "silence" period. The buzzer will beep 1 short high tone.

0xC004 Transaction Type 5 ACKNOWLEDGE message—(bounce transaction). The interrogator 12 has read the FLAGS register, and the bounce bit was found to be set by a previous interrogator 12 transaction sequence. The transaction counter 146 is not incremented. The transponder 14 enters a ten second "silence" period. A microcontroller message will be generated. (This might be used to silence a bounced transponder 14 instead of using a Transaction Type 1 record type.) The buzzer will beep 2 long low tones.

0xC005 Transaction Type 6 ACKNOWLEDGE message—(load block C) The 16 bytes following the status code will be written into memory block C. The transponder 14 will respond to the next POLL message. The status code and the 16 bytes following the status code will be formatted into a microcontroller message.

0xC006 Transaction Type 7 ACKNOWLEDGE message—(load block D) The 16 bytes following the status code will be written into memory block D. The transponder 14 will respond to the next POLL message.

0xC007 Transaction Type 8 ACKNOWLEDGE message—(microcontroller message) The status code and the 16 bytes following the status code will be formatted into a microcontroller message. The transponder 14 enters a ten second "silence" period. (This could be used to load the EEPROM history file.) The buzzer will beep 3 short high tones.

0xC008 Transaction Type 9 ACKNOWLEDGE message—(transponder 14 turn-on). The ACKNOWLEDGE message contains the previously-silenced transponder 14 account number, and the transponder 14 will now become active and will respond to the next POLL message.

0xC009 Transaction Type 10 ACKNOWLEDGE message—(transponder 14 silenced.) No transaction will take place. Although the transponder 14 responded, it is not a proper account for this tollway. The transponder 14 enters a ten second "silence" period. A microcontroller message will be generated. The buzzer will beep 1 long low tone.

0xC00A Transaction Type 11 ACKNOWLEDGE message—(transponder 14 silenced.) No transaction will take place. The transponder 14 enters a ten second "silence" period. No microcontroller message will be generated.

0xC00F Transaction Type 16 ACKNOWLEDGE message—(bounce transponder). The bounce bit will be set in the FLAGS register, and the transaction counter 146 will be incremented. A microcontroller message will be generated. The transponder 14 will continue to respond to an agency or maintenance code POLL request, but the interrogator 12 will recognize immediately that the user account has a problem, and the transponder 14 will require a service center trip. The buzzer will beep 2 long low tones.

Structure of the status code from the ACKNOWLEDGE message:

The 16 bit status code from the ACKNOWLEDGE message is encoded with special fields. The first three bits (MSB's) are coded as:

| | |
|---|---|
| 000 | no operation |
| 001 | (reserved) |
| 010 | (reserved) |
| 011 | (reserved) |
| 100 | decrements account balance (uc). Then the next thirteen bits describe an unsigned integer value to decrement from the current balance. |
| 101 | microcontroller function w/o data (uc). Then the next thirteen bits describe a microcontroller function to perform. |
| 110 | microcontroller function with data (uc). Then the next three bits describes the number of data bytes that follow. (as n plus one times two). i.e., 000 = two data bytes follow. 001 = four data bytes follow. 111 = sixteen data bytes follow. |
| 111 | (reserved) |

Agency Codes:

The agency code represents the two bytes transmitted after the record type in the POLL message, and it consists of the MSB byte and the LSB byte. The ASIC 34 will have the ability to store two bytes of user-defined agency code for these comparisons.

For a transponder 14 to immediately respond to a interrogator 12, one of two conditions must be met:

1) the MSB and LSB bytes of the incoming agency code must match the user-defined agency code, or 2) the MSB byte of the incoming agency code must match the user-defined MSB agency code, and the LSB byte must match the internally-defined "group" response code of 0xFF.

As an example, the user-defined agency code in the ASIC might be 0x5061 with the group response code of 0xFF. In this case, for the ASIC to immediately respond, the incoming Agency code would have to be either 0x5061 or 0x50FF. Any other incoming Agency code would not cause the ASIC to respond immediately. If these conditions are not met, a microcontroller message will be generated. The microcontroller will then check its internal list of valid agency codes, and modify the ASIC's 34 user-defined agency code to that of the incoming agency code (if appropriate). After modification of the transponder's 14 user-defined agency code registers and account balance registers, the transponder 14 would be able to respond to the interrogator 12. It is envisioned that the transponder 14 will have the issuing agency's identification programmed into its account number. It will be a lane controller or interrogator's 12 responsibility to verify the true validity of the transponder account for the given situation, and to make the proper transaction.

Preferred message structures:
WAKEUP structure:
  Length: 10 bits
  Sequence: wakeup_modulation (ten manchester-encoded 1's)
POLL structure:
  Length: 10.5 bytes
  Sequence: header (1.5 bytes)
  record_type (2 bytes)
  agency_code (2 bytes)
  time (2 bytes)
  encode_key (1 byte)
  CRC (2 bytes)
RESPONSE structure:
  Length: 21.5 bytes or 37.5 bytes
  Sequence: header (1.5 bytes)
  record_type (2 bytes)
  memory_block_A (16 bytes)
  additional_data (16 bytes) optional CRC (2 bytes)
ACKNOWLEDGE structure:
  Length: 19.5 bytes or 35.5 bytes
  Sequence: header (1.5 bytes)
  record_type (2 bytes) transponder_ID (6 bytes) reader_ID (6 bytes) status_code (2 bytes) additional_data (16 bytes) optional CRC (2 bytes)

The ASIC 34 typically expects the transaction to be completed in the same cycle (i.e. during the same WAKEUP-POLL-ACKNOWLEDGE sequence). However, if the agency code "silence" period of the POLL message is still in effect, the ASIC will listen to the ACKNOWLEDGE message for a special Type 9 ACKNOWLEDGE message containing it's account number for possible turn-on.

Example interrogator-ASIC Message Timing:
(Each Manchester-encoded bit is 3.333 us wide.)

| Period | # Bits/ Min | # Bits/ Max | Time (uS) Min | Time (uS) Max | Open Entry (uS) | Open Exit (uS) | Closed (uS) |
|---|---|---|---|---|---|---|---|
| WAKEUP | 10 | | 33.3 | | 33.3 | 33.3 | 33.3 |
| delay | | | 100 | | 100 | 100 | 100 |
| POLL | 84 | 84 | 280 | 280 | 280 | 280 | 280 |
| delay | | | 10 | | 10 | 10 | 10 |
| Lane_Pulses | | | 10 | | 10 | 10 | 10 |
| delay | | | 80 | | 80 | 80 | 80 |
| RESPONSE | 172 | 300 | 573.3 | 1000 | 573.3 | 1000 | 573.3 |
| delay | | | 100 | | 100 | 100 | 100 |
| ACK | 156 | 284 | 520 | 946.7 | 946.7 | 520 | 520 |
| delay | | | 10 | | 10 | 10 | 10 |
| Total | | | 1716.6 | 2570 | 2143.3 | 2143.3 | 1716.6 |

The timing described hereinabove is merely exemplary. Other timing protocols, procedures and techniques are comprehended by this specification. Various modifications and combinations of the illustrative embodiments, as well as other embodiments of the invention, will be apparent to persons skilled in the art upon reference to the description. It is therefore intended that the appended claims encompass any such modifications or embodiments.

Special Functions

Power-up Reset: The digital ASIC 34 contains a power-up reset circuit to properly initialize the circuitry upon connection to a battery. An external reset pin is also provided to allow a manual reset to initiated during maintenance operations/testing. The external reset pin may be grounded to initiate a reset, and this will cause the digital ASIC 34 to lose all previously programmed data and clear all counters and registers.

Battery Consumption Gauge: The battery consumption for powerup stages 2 and 3 is measured by a special conversion/calculation circuit on the digital ASIC 34. The battery consumption by these two stages are counted in a special register whose two high-order bits are included as part of the FLAGS register. The status of the two (MSB) bits indicate:

00:<174 mAH used
01:174 mAH<->348 mAH used
10:348 mAH<->522 mAH used
11:>522 mAH used Buzzer Output: The preferred embodiment digital ASIC 34 has the ability to drive a piezoelectric transducer to allow audible tones to be generated in response to certain transponder functions. A high beep (1172 hz) might indicate a successful function. A low tone (586 hz) generally might indicate an unsuccessful function. A long tone is approximately ¾ second (872 ms) long, and a short beep is approximately ¼ second (218 ms)long, both with approximately ½ second (436 ms) spacing.

Example Audio Messages:

| Situation | Sound |
| --- | --- |
| Successful Transaction | 3 short high beeps |
| Successful Data Load | 1 short high beep |
| Bad Account Status | 2 long low tones |
| Tollway/account mismatch | 1 long low tone |

Maintenance Mode and Messages

A maintenance mode is provided in which the toll agency or other authorized entity can fixedly store user information into the transponder's memory. This information includes: the type of encryption; whether encryption is used; whether lane discrimination is implemented; the FSK frequencies used; in transit information about the payload, such as weight, value, or toxicity; whether a microprocessor is attached to the transponder 14; the user account #; the amount of money stored on the transponder 14. The transponder does not become activated until an authorized individual puts the transponder into maintenance mode at a programming station by sending an access code. The transponder or transponder 14 may provide a maintenance mode acknowledgement signal to the interrogator 12, the maintenance mode acknowledgement signal for confirming to the interrogator that the transponder is in maintenance mode. The agency then programs the transponder with user information. A change of agency code or the expiration of the 10 second timer will cause the maintenance mode to cease.

The following functions are valid only if the maintenance mode is in effect. In maintenance mode, the lane discrimination controller 124 is disabled. The special message formats used for testing of the ASIC in maintenance mode include:

Poll Messages

Type 1 Maintenance POLL message
The transponder is requested to send memory blocks A and B in the next RESPONSE message.
Type 2 Maintenance POLL message
The transponder is requested to send memory blocks A and C in the next RESPONSE message.
Type 3 Maintenance POLL message
The transponder is requested to send memory blocks A and D in the next RESPONSE message.
Type 4 Maintenance POLL message
The transponder is requested to send memory block A in the next RESPONSE message.
Type 5 Maintenance POLL message
The transponder is requested to send memory block A and the maintenance block.
Type 6 Maintenance POLL message
The battery consumption gauge clock is disconnected, the registers are loaded with test data, the registers are incremented by one clock, and the register values are read out in the RESPONSE message. The original contents must be saved, a new value calculated, and the new value stored into the battery consumption registers before the transponder is put back into operation. The transponder will respond with a Type 2 RESPONSE message.
Type 7 Maintenance POLL message
The transponder is requested to send the entire contents of the RECEIVE buffer. This special POLL message format is used to directly load the RECEIVE buffer with test data. The transponder will respond with a Type 6 RESPONSE message, which will be unencrypted.

Response Messages

Type 5 Maintenance RESPONSE message
The transponder is responding with memory blocks A and the maintenance block.
Type 6 Maintenance RESPONSE message
The transponder is responding with memory block A and the contents of the RECEIVE buffer. This message is unencrypted, and does not contain the tag's account number. The interrogator will have stored the account number of the tag from a previous POLL/RESPONSE sequence, and will use the account number in the corresponding ACK message for this response.

Acknowledge Messages

Type 1 Maintenance ACKNOWLEDGE message
No operation is performed. The status code is ignored.
Type 2 Maintenance ACKNOWLEDGE message
The message following the status code is to be loaded into memory block D. The status code is ignored.
Type 3 Maintenance ACKNOWLEDGE message
The message following the status code is to be loaded into memory block C. The status code is ignored.
Type 4 Maintenance ACKNOWLEDGE message
The message following the status code is to be loaded into memory block B. The status code is ignored.
Type 5 Maintenance ACKNOWLEDGE message
The message following the status code is to be loaded into memory block A. The status code is ignored.
Type 6 Maintenance ACKNOWLEDGE message
This indicates that the message following the status code are written into the maintenance registers. The status code is ignored.
Type 7 Maintenance ACKNOWLEDGE message This indicates that the status code and the message following the status code are written to the microcontroller. The status code indicates the nature of the instruction.

Type 8 Maintenance ACKNOWLEDGE message

The bounce bit is reset. No other operation is performed. The status code is ignored.

Additional capabilities envisioned include, but are not limited to, EEPROM memory, LCD drive capability with push button selection, serial communications, and piezoelectric buzzer drive.

The sole table below comprises the terms used in this patent application, including some alternate and preferred terms. Other terms may be used which are not listed in the sole table.

TABLE

| Drawing Element | Generic Term | Preferred or Specific Term | Alternate Terms |
|---|---|---|---|
| 10 | Vehicle Identification System | Automatic Vehicle Identificaiton System | AVI System |
| 12 | Interrogator | Interrogator | Reader |
| 14 | Transponder | Transponder | Responder, Tag |
| 16 | Host | Host | Toll Booth Computer, Toll Plaza Computer |
| 18 | Antenna | Directional Antenna | Interrogator Antenna |
| 20 | Electronics Module | Interrogator Electronics Module | |
| 22 | Interconnect | RF Interconnect | RF coax, Coaxial Cable |
| 24 | Connection | Host Connection | RS232 Connection, RS422 Connection, Host Connection |
| 26 | Vehicle | Vehicle | Automobile |
| 28 | Lane | Vehicle Lane | |
| 30 | Antenna | Transponder Antenna | transponder Antenna, Responder Antenna |
| 31 | Integrated Antenna | Integrated Transponder Antenna | Integrated Transponder Reflector/Antenna |
| 32 | Control Circuit | Analog ASIC | Analog/Digital ASIC |
| 34 | Control Circuit | Digital ASIC | Digital Processing Section |
| 36 | Receive Buffer Block | | |
| 38 | Main Controller Block | | |
| 40 | Transmit Block | | |
| 41 | Reflector | Modulated Reflector | |
| 42 | Wake-up Burst | Trigger signal | Activation Signal |
| 44 | Field Strength Pulse | Field Strength Pulse | |
| 45 | Lane Discrimination Period | First Lane Discrimination Period | |
| 46 | Lane Discrimination Period | Second Lane Discrimination Period | |
| 47 | Lane Discrimination Period | Third Lane Discrimination Period | |
| 48 | Memory | Transponder Memory | |
| 50 | Reference Oscillator | Toll Plaza Reference Oscillator | Reference Generator |
| 51 | Output | Output of Toll Plaza Reference Osc | |
| 52 | Transmitter | Transmitter | Illuminator Transmitter, Transmitter Module |
| 54 | Receiver | Receiver | Receiver Module, Demodulator |
| 56 | Control Circuit | Interface Circuit | Computer Interface |
| 60 | Wake-Up Block | Multi-Stage Wake-up Circuitry | |
| 62 | First Stage Circuitry | Threshold Detector | |
| 64 | Second Stage Circuitry | Wake-up Circuit | Modulation Detector |
| 66 | Power Source | Battery | |
| 70 | Detector | | |
| 72 | Filter | Low Pass Filter | |
| 74 | Filter | High Pass Filter | |
| 76 | Pulse Generator | | |
| 78 | Counter | Pulse Counter | |
| 80 | Main Controller Block | | |
| 82 | Rectifier | Diode | |
| 84 | Capacitor | Shunt Capacitor | |
| 86 | Resistor | Shunt Resistor | |
| 88 | Capacitor | Series Capacitor | |
| 90 | Resistor | Shunt resistor | |
| 92 | Comparator | Gated Comparator | |
| 94 | Terminal Count Pin | | |
| 96 | Latch | Gated Latch | |
| 97 | OR gate | | |
| 98 | Switch | Power Switch | |
| 100 | Recieve Buffer Block | | |
| 102 | Manchester Decoder | | |
| 104 | Main Controller | | |
| 106 | CRC Generator | | |
| 108 | Lane Discrimination Circuit | | |
| 110 | Receiver State Controller | | |
| 112 | Shift Register | Serial-to-Parallel Shift Register | |
| 114 | Counter | Byte Counter | |
| 116 | Register | Holding Register | Latch |
| 118 | SRAM | SRAM | Latch |
| 120 | Comparator | Address Comparator | |
| 122 | Buffer | Receive Buffer | |
| 124 | Controller | Lane Discrimination Controller | |
| 126 | Capacitor | Sample and Hold Capacitor | |
| 130 | Comparator & Decoder | | |

TABLE-continued

| Drawing Element | Generic Term | Preferred or Specific Term | Alternate Terms |
|---|---|---|---|
| 132, 134 | Switch | Sample and Hold Switches | |
| 137 | Timer | Short Timer | |
| 138 | Timer | Long Timer | |
| 140 | Main Controller Block | | |
| 142 | Comparator | | |
| 146 | Counter | Transaction Counter | |
| 148 | Main Memory Block | | |
| 150 | Memory | Main Memory | |
| 152, 154 | Address Selection Circuit | Multiplexer | Mux |
| 156 | Response Selection Circuit | Multiplexer | Mux |
| 158 | Register | Byte Register | |
| 160 | Encryptor | Encryptor | Encryption Circuit |
| 162 | CRC Generator | | |
| 164 | Header Generator | | |
| 166 | Modulator | | |
| 168 | Controller | Transmitter Controller | |
| 170 | Clock Circuit | | |
| 172 | External Interface Circuit | External I/F | |
| 174 | Controller | Secondary Controller | Interface Controller, IF Controller |
| 176 | Bit Counter | | |
| 178 | I/O Buffer | | |
| 180 | Data Out Select | Data Out Mux | |
| 182 | Clock Select | Clock Select Mux | |
| 184 | Counter | 138 bit counter | |
| 186 | Counter | 8 bit counter | |
| 190 | Buzzer Block | | |
| 192 | Controller | Buzzer Controller | |
| 194, 196, 198, 200, 202 | Divider | Tone Divider | Clock Divider |
| 204, 206 | AND | | |
| 208 | OR | | |
| 210 | Buffer | | |
| 212 | Buzzer | | Speaker, Piezo |
| 214 | Clock | Main Oscillator | Main Clock |
| 216, 218, 220 | Divider | Clock Divider | |
| 222 | Modulator | Mixer | |

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The terms "controller," "processing circuitry," and "control circuitry" comprehend ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Frequency shift keyed (FSK) modulation is envisioned as a possible data modulation scheme, as well as pulse-pause modulation, amplitude shift keying (ASK), quadrature AM (QAM) modulation, phase shift keying (PSK), quadrature phase shift keying (QPSK), or any other modulation. Different types of multiplexing such as time or frequency modulation might be effected to avoid cross-signal interference. Modulation might be effected by backscatter modulation, by active modulation of a carrier, or by another method. Discrete components or fully integrated circuits in silicon (Si), gallium arsenide (GaAs), or other electronic materials families, as well as in optical-based or other technology-based forms and embodiments might be used to implement the circuits described herein. It should be understood that various embodiments of the invention can employ or be embodied in hardware, software or microcoded firmware.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A transponder operable to communicate in a wireless fashion with an interrogator, said transponder comprising:

a) a receiver for receiving RF energy;

b) a transponder controller in electrical communication with said receiver, said transponder controller being normally in a quiescent, power conserving condition and, in response to a wake-up signal, assuming a higher power-consuming condition wherein said controller is operable to receive an RF interrogation from said interrogator and to perform operations in response thereto;

c) a first stage circuit for receiving said RF energy from said receiver and for sending said wake-up signal if said received RF energy has certain predetermined characteristics;

d) a wake-up controller operable to intercept said wake-up signal from reaching said transponder controller for a power saving period if no proper RF interrogation is received during the reception of said RF energy, in spite of said RF energy having the certain predetermined characteristics necessary for said first stage circuit to send said wake-up signal, said wake-up controller upon expiration of said power saving period further serving to again pass said wake-up signal from said first stage circuit to said transponder controller.

2. The transponder of claim 1 wherein said wake-up controller comprises an interference counter that increments each time said transponder controller receives a wake-up signal without receiving an proper RF interrogation.

3. The transponder of claim 2 wherein said wake-up controller further comprises a wake-up counter that decrements from a count loaded therein, thereby setting the duration of said power saving period.

4. The transponder of claim 3 wherein said loaded count is proportional to the value stored in said interference counter whereby the duration of the power saving period is generally proportional to the number of consecutive times that the transponder controller receives a wake-up signal without receiving a proper RF interrogation.

5. The transponder of claim 1 wherein said transponder controller further comprises an activation timer such that said transponder controller remains in its higher power-consuming condition and wherein said controller is operable to monitor the received RF energy for a proper RF interrogation for an activation period determined by said activation timer.

6. The transponder of claim 1 wherein upon expiration of said activation period, said transponder controller sends a signal to said wake-up controller requesting that said wake-up controller for said power saving period intercept further wake-up signals from said first stage circuitry.

7. The transponder of claim 6 wherein said wake-up controller enters its quiescent, power conserving condition after requesting said wake-up controller to intercept further wake-up signals.

8. A transponder operable to communicate in a wireless fashion with an interrogator, said transponder comprising:

a) a receiver for receiving RF energy;

b) a transponder controller in electrical communication with said receiver, said transponder controller being normally in a quiescent, power conserving condition and, in response to a wake-up signal, assuming a higher power-consuming condition wherein said controller is operable to receive an RF interrogation from said interrogator and to perform operations in response thereto;

c) a first stage circuit for receiving said RF energy from said receiver and for sending said wake-up signal if said received RF energy has certain predetermined characteristics;

d) a wake-up controller comprising a wake-up counter and an interference counter, said wake-up controller being operable to intercept said wake-up signal from reaching said transponder controller for a power saving period if no proper RF interrogation is received during the reception of said RF energy, despite said RF energy having the certain predetermined characteristics necessary for said first stage circuit to send said wake-up signal, said wake-up controller further serving to again pass said wake-up signal from said first stage circuit to said transponder controller upon expiration of said power saving period, the duration of which is a function of the count loaded in said wake-up counter, the count in turn being a function of the value of the count stored in the interference counter, which increments each time said transponder controller receives a wake-up signal without receiving an proper RF interrogation, whereby the duration of the power saving period is generally proportional to the number of consecutive times that the transponder controller receives a wake-up signal without receiving a proper RF interrogation.

9. A method for conserving power in a recognition system, the method comprising the steps of:

a) receiving in a transponder an RF signal;

b) testing said RF signal in said transponder for a certain predetermined threshold characteristic;

c) upon detection of said certain predetermined threshold characteristic, activating in said transponder an activation timer that is operable to set an activation period during which said transponder tests said RF signal for a proper RF interrogation signal; and d) entering a power saving mode if no proper RF interrogation signal is received during said activation period wherein said transponder is impervious to subsequent RF signals for a power saving period.

10. The method of claim 9 and, if said RF signal is not a proper RF interrogation, further comprising the step of incrementing an interference counter in proportion to the duration of said RF signal.

11. The method of claim 10 wherein a wake-up counter determines the duration of said power saving period.

12. The method of claim 11 wherein said wake-up counter is loaded with a value proportionate to the value of said interference counter such that the duration of said power saving period is proportional to the duration of said RF signal, if said RF signal is not a proper RF interrogation signal.

13. The method of claim 12 and further comprising the step of activating a power saving oscillator before entering said power saving period, wherein said wake-up counter receives its clock impulses from said power saving oscillator.

14. The method of claim 9 wherein a wake-up controller renders said transponder impervious to said subsequent RF signals.

15. The method of claim 14 wherein said wake-up controller comprises said interference counter and said wake-up counter.

16. The method of claim 9 wherein wake-up circuitry comprising a wake-up controller resides in an analog ASIC and wherein said analog ASIC is operable to enable and disable activation of transponder control circuitry by received RF signals.

17. The method of claim 9 wherein said power saving mode is a radio silence period during which said transponder maintains radio silence while other systems send system control signals.

18. The method of claim 17 wherein said control signals are operable to suppress signals from the source of the spurious RF energy.

19. A method for conserving power in a recognition system, the method comprising the steps of:

a) receiving in a transponder an RF signal;

b) activating in said transponder an activation counter;

c) testing in said transponder said RF signal for a proper interrogation signal from an interrogator;

d) incrementing an interference counter upon said activation counter decrementing to zero without said transponder having received said proper RF interrogation signal;

e) activating in said transponder a wake-up counter, said wake-up counter being loaded with a value proportional to the count stored in said interference counter; and f) placing said transponder into a power saving mode whereby said transponder is impervious to subsequent RF signals for a power saving period wherein said power saving period continues while said wake-up counter decrements to zero.

20. The method of claim 19 and further comprising the steps of re-activating said activation counter upon expiration of said power saving period and retesting in said transponder said RF signal for a proper interrogation signal.

21. The method of claim 20 and further comprising the step of again incrementing said interference counter if said activation counter again decrements to zero without said transponder having received said proper RF interrogation signal and again activating said wake-up counter wherein said wake-up counter is loaded with a value proportional to a new count stored in said interference counter, said new count resulting from incrementing said count.

22. The method of claim 21 and further comprising the step of again placing said transponder into a power saving mode, said power saving mode lasting an extended power saving period proportional to the new count stored in said interference counter.

23. An improved transponder of the type (a) which is capable of receiving and processing valid signals, (b) which is capable of receiving, but not processing spurious signals, (c) which, prior to the receipt of either signal, is normally in a sleep state wherein it consumes a relatively low level of power from a source, and (d) which, upon receipt of either signal, assumes a wakened state wherein it consumes a relatively high level of power from the source, wherein the improvement comprises:

first means
  (a) responsive to receipt of a first spurious signal while the transponder is in the normal sleep state for preventing the transponder from leaving the sleep state for a first time period which is a function of the duration of the first spurious signal, and
  (b) responsive to receipt of a subsequent spurious signal which occurs or is extant at the expiration of the first time period for preventing the transponder from leaving the sleep state for a second time period which is the sum of (i) the first time period and (ii) a time period which is a function of the duration of the second spurious signal beginning with the expiration of the first time period, the transponder being incapable of receiving or processing signals during the first or second time periods; and second means responsive to the absence of a spurious signal while the transponder is not being prevented from leaving the sleep state by the first means
  (a) for permitting the transponder to assume the wakened state, and
  (b) for causing the first means to respond to a spurious signal which occurs after such absence as a first spurious signal.

* * * * *